Dec. 21, 1965  C. C. KINKER  3,224,307
METHOD AND APPARATUS FOR HANDLING SHEET MATERIALS
Filed Jan. 2, 1963  15 Sheets-Sheet 1

INVENTOR.
CLARENCE C. KINKER
BY J.R.NELSON &
W.A.SCHAICH
ATTORNEYS

INVENTOR.
CLARENCE C. KINKER
BY J.R. NELSON &
W.A. SCHAICH
ATTORNEYS

INVENTOR.
CLARENCE C. KINKER
BY
J.R. NELSON &
W.A. SCHAICH
ATTORNEYS

INVENTOR.
CLARENCE C. KINKER
BY J.R. NELSON &
W.A. SCHAICH
ATTORNEYS

INVENTOR.
CLARENCE C. KINKER
BY J.R.NELSON &
W.A.SCHAICH
ATTORNEYS

Dec. 21, 1965   C. C. KINKER   3,224,307
METHOD AND APPARATUS FOR HANDLING SHEET MATERIALS
Filed Jan. 2, 1963   15 Sheets-Sheet 8

INVENTOR.
CLARENCE C. KINKER
BY   J.R. NELSON &
    W.A. SCHAICH
    ATTORNEYS

Dec. 21, 1965  C. C. KINKER  3,224,307
METHOD AND APPARATUS FOR HANDLING SHEET MATERIALS
Filed Jan. 2, 1963  15 Sheets-Sheet 11

INVENTOR.
CLARENCE C. KINKER
BY
J.R.NELSON &
W.A.SCHAICH
ATTORNEYS

Dec. 21, 1965  C. C. KINKER  3,224,307
METHOD AND APPARATUS FOR HANDLING SHEET MATERIALS
Filed Jan. 2, 1963  15 Sheets-Sheet 12

INVENTOR.
CLARENCE C. KINKER
BY  J.R. NELSON &
W.A. SCHAICH
ATTORNEYS

Dec. 21, 1965   C. C. KINKER   3,224,307
METHOD AND APPARATUS FOR HANDLING SHEET MATERIALS
Filed Jan. 2, 1963   15 Sheets-Sheet 13

INVENTOR.
CLARENCE C. KINKER
BY  J.R. NELSON &
    W.A. SCHAICH
    ATTORNEYS

INVENTOR.
CLARENCE C. KINKER
BY
J.R. NELSON &
W.A. SCHAICH
ATTORNEYS

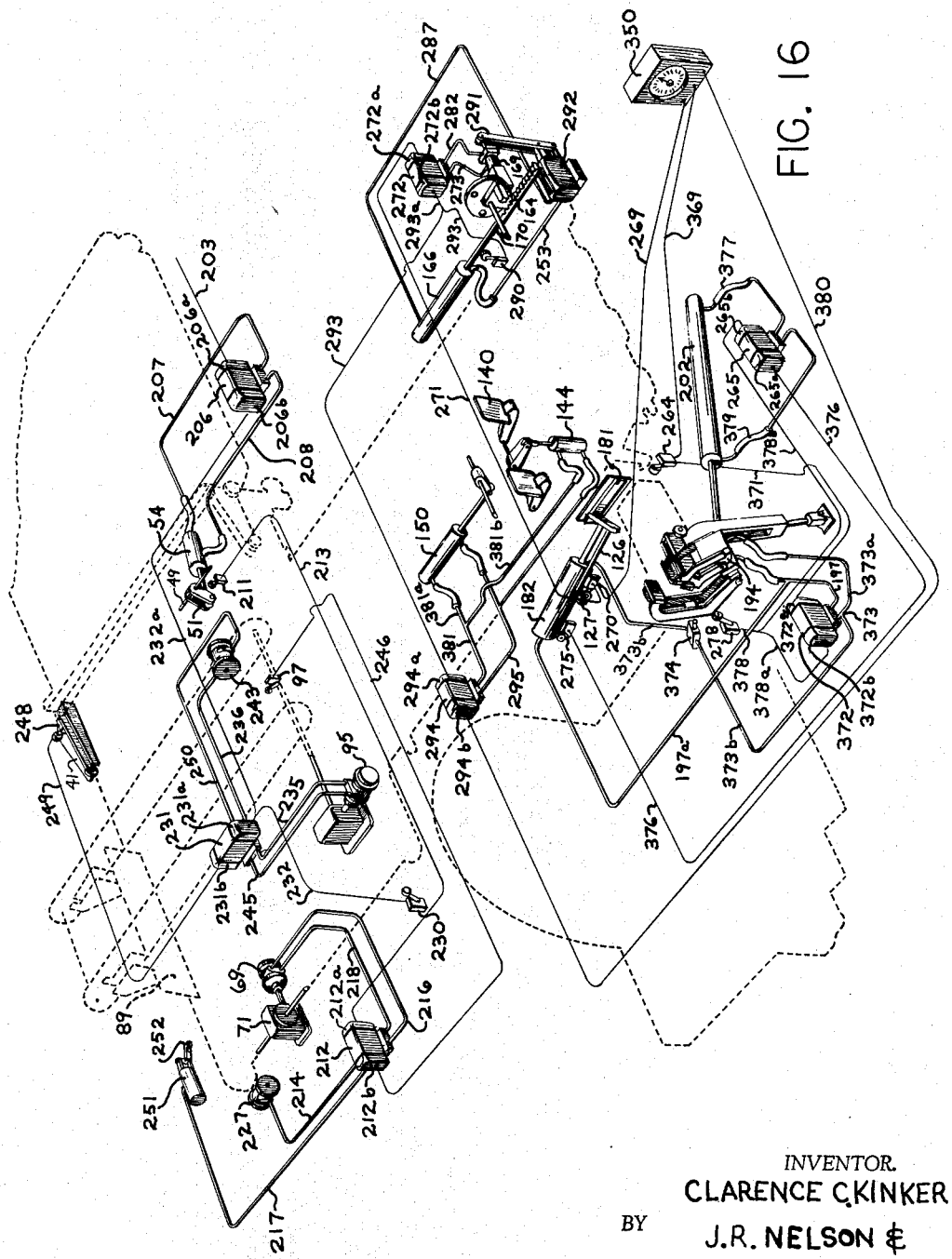

United States Patent Office 3,224,307
Patented Dec. 21, 1965

3,224,307
METHOD AND APPARATUS FOR HANDLING
SHEET MATERIALS
Clarence C. Kinker, Toledo, Ohio, assignor to Owens-Illinois Glass Company, a corporation of Ohio
Filed Jan. 2, 1963, Ser. No. 249,025
15 Claims. (Cl. 83—35)

This invention relates generally to a method and apparatus for handling sheet material and more particularly to a method and apparatus for processing large panels of cardboard or like material to slit and cut them to any desired size with no manual handling required except loading and unloading.

In the manufacture of corrugated cardboard carton separators, such as are used in packaging various types of glassware, it is customary to start with relatively large panels of cardboard and cut the panels into separators of the desired size. Typically this involves loading the large panels onto a conveyor leading to a plurality of slitters which cut the large sheets into a plurality of sections or blanks of the height required for the finished separator. These long blanks are then manually removed from the slitter and fed into a saw which cuts them to the proper length and notches them. From the saw the separators are placed on pallets for temporary storage.

In the cutting operation described above, typically there is an operator to load the large sheets to the slitter. A second operator removes the long slitted blanks from the slitter and feeds them to the saw, while a third operator removes them from the saw. Problems are presented in the above operation in that it is impossible to properly coordinate the work load among the various steps in the operation. For example, it is possible for the slitter to turn out the long blanks much faster than the saw can process them. As a result, the speed of the saw limits the speed with which the slitter can operate. This in turn leaves the slitter loader operator to stand idle for long periods of time in each cycle. Such inefficiency, of course, greatly increases the cost of processing.

The present invention eliminates this inefficiency by providing completely automatic sheet handling mechanism from the time the sheets are loaded to the slitter to the time the cut-to-size separators are removed from the saw.

Accordingly, it is an object of this invention to provide a completely automatic apparatus for handling large sheets of material as they are trimmed to desired uniform sizes.

Another object of this invention is to provide apparatus for stacking long slitted blanks into bundles and unloading the bundles to a mechanism adapted to reorient single bundles into position for cutting.

An additional object of this invention is to provide apparatus for moving said reoriented bundles to a saw for cutting to proper length.

A further object of this invention is to provide a novel method for handling sheet material during its cutting to smaller sizes.

Still another object of this invention is to provide an exhaust valve for controlling deceleration and stoppage of air motors powering the movement of conveyors.

A more detailed description and a better understanding of this invention may be gained from the following description taken in conjunction with the drawings in which:

FIG. 16 is a schematic view of the hydraulic systems used to operate the apparatus of the present invention.

Figure 1:
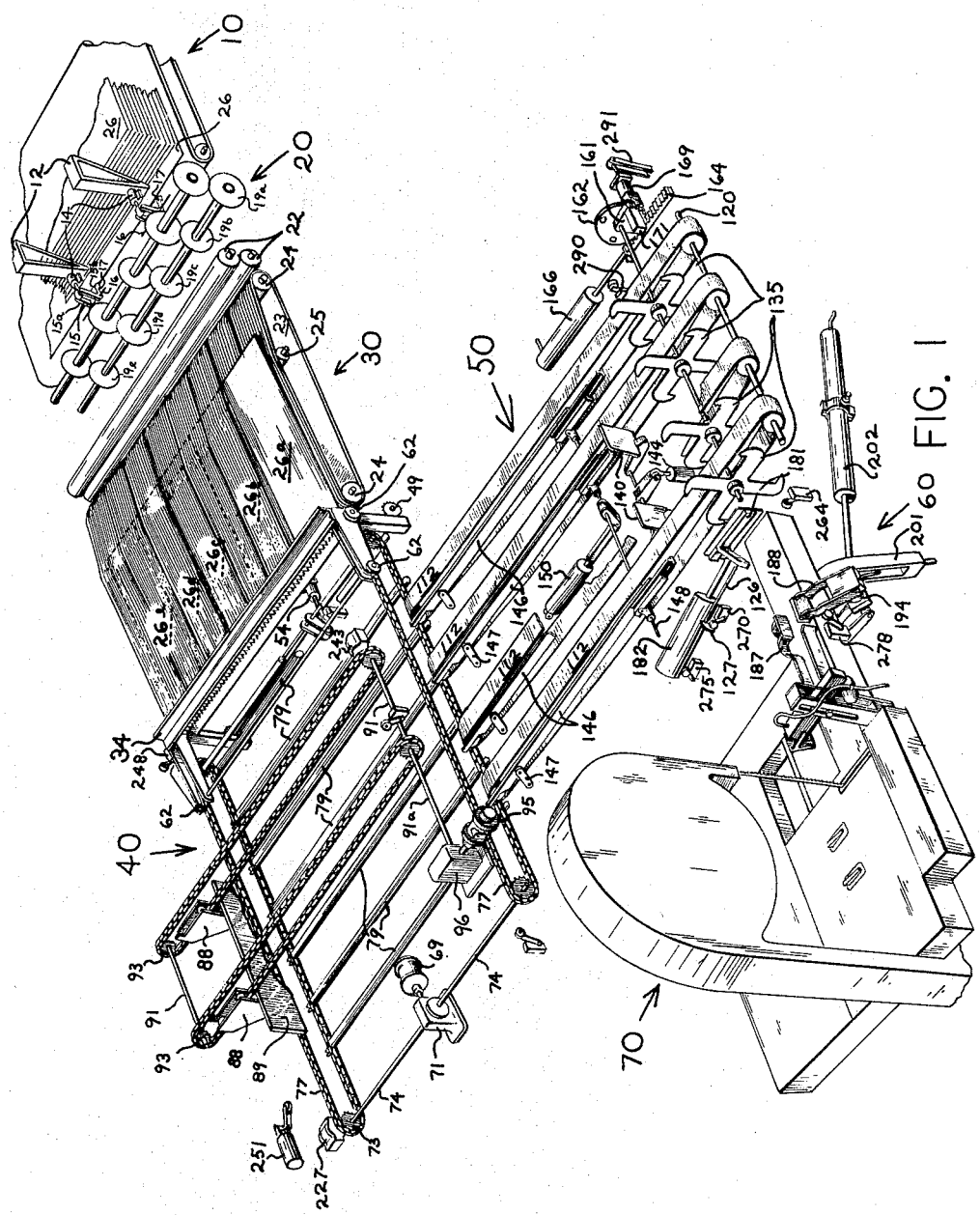
FIG. 1 is a perspective view showing the apparatus of this invention.

In brief, and with reference to FIG. 1, this invention comprises a conveyor 10 for feeding single panels of sheet material through a slitter 20 which may be adjusted to slit the large sheet into blanks of any desired width. The slitted blanks are fed from the slitter to an underfeed stacker 30 where the blanks are stacked into bundles. At the end of the underfeed stacker 30 is an unloader 40 having a backstop which temporarily stops each of the slitted blanks and thereby aligns the ends of the blanks. After a predetermined number of blanks have been stacked, the backstop is caused to move away from the slitters in the direction of slitting. The underfeed stacker 30 which moved the blanks to the backstop causes the stacked bundles to move with the backstop onto the unloader 40. As the bundles enter the unloader, they are engaged and supported by a plurality of transversely disposed members mounted for operation with the backstop. When the backstop reaches the end of its longitudinal stroke, a pusher plate, mounted for transverse movement with respect to the backstop movement, pushes the bundles off the transverse supporting members and onto an uprighter 50 which is adapted to successively turn each bundle so that each blank thereof rests on its longitudinal edge. From the uprighter 50, the edge-turned bundles are fed longitudinally with respect to their length to a clamp 60 which supports and moves the edge-turned bundles to a saw 70 where they are cut to desired length.

The saw mechanism is of known construction and does not constitute part of the present invention. Although it may be used with many types of saws, the apparatus of the present invention is specifically adapted for use with the saw described in U.S. Patent No. 2,855,009 to McCormick, assigned to the assignee of the present invention.

Referring to the specific details, the conveyor 10 feeds large panels 26 of cardboard or similar sheet material to the slitter 20 which slits the panels into a plurality of blanks 26a–e of desired widths. The conveyor 10 serves to move the panels 26, either singly or in stacks of any desired height, from a loading area to the slitter 20. The panels 26 are fed singly through the slitter 20. Accordingly, when the sheets are on the conveyor 10 in stacks, it is necessary to provide means for removing single panels from the stack to the slitter 20. Such means include a pair of brackets 12 supported by a structural cross-member (not shown). The lower end of each of the brackets 12 is positioned above the conveyor 10 a sufficient distance to permit only a single panel 26 of cardboard to pass thereunder. A fluid pressure cylinder 14 is mounted on each of the brackets 12. Pivotally connected to the free end of the piston rod of each cylinder 14 is a rocker member 15. Each rocker member 15 has an upstanding leg 15a and an outwardly extending leg 15b at substantially right angles to each other. Each of the rocker members 15 is pivotally supported on a shaft 16 at the juncture of the two legs 15a and 15b. The shafts 16 may be supported by any desired means to the brackets 12. Each of the outwardly extending legs 15b has a downwardly extending arm 17 appended to its free end. In FIG. 1 the free ends of the respective cylinder piston rods are retracted so that the lower ends of the downwardly extending arms 17 are close enough to the conveyor to prevent the single panel 26 of cardboard which has passed under the brackets 12 from passing thereunder. Upon activation of cylinders 14, the free ends of the respective piston rods are extended slightly, thereby causing the downwardly extending arm 17 of the rocker member 15 to be pivotally moved upward to thereby permit single panel of cardboard 26 to pass thereunder and through the slitters 20. After a predetermined number of panels 26 has passed under the downwardly extending arm 17 of the rocker member 15, the cylinders are again activated by any preferred counting means to retract their respective piston rods to lower the downwardly extending arm 17 and prevent additional panels from passing to the slitter 20.

The slitter 20 is known in the art and requires no additional description except to note that it may be supplied with any number of knives depending on the number of blanks to be cut from a single panel 26 of cardboard. Also, the spacing between the knives may be varied to cut blanks of any desired width. The slitter in FIG. 1 is shown with five pairs of knives 19a, 19b, 19c, 19d and 19e, respectively. Assuming that the knives 19a merely trim any excess from the panel 26 and the knives 19e cut a full width blank, the slitter 20 as shown in FIG. 1 will cut five blanks from each panel of cardboard. These blanks have been designated 26a, 26b, 26c, 26d and 26e, respectively. The blanks pass between a pair of rollers 22 which assist in pulling them through the slitter 20.

As each of the respective blanks leaves the slitter 20 it travels to the underfeed stacker 30. The edge of the underfeed stacker is aligned with the first pair of knives 19a so that any excess which is trimmed from the panel 26 will fall harmlessly to a salvage collector.

Underfeed stacker

The underfeed stacker 30 comprises a plurality of endless belts 23 supported on continuously rotating rollers 24 powered by any desired means (not shown). A center roller 25 is positioned between the end rollers 24 and is elevated above the plane defined by the respective end rollers 24. The roller 25 thus causes each of the belts 23 to have a hump about which each of the blanks pivots as it is moved from the slitter 20. At the end of the belts 23 is positioned a backstop 34 of the unloader. As the ends of the respective blanks 26a–e contact the backstop 24, the blanks are caused to stop and remain stationary even though the belts 23 continue to move. As will become clear from the following, each successive set of blanks 26a–e is fed underneath the preceding set to thereby stack the respective sets.

The position of the center roller 25 between the two end rollers 24 may be adjusted, its location depending upon the length of the blanks 26a–e. Thus, the distance between the point of contact of the backstop 34 and the center of the roller 25 must be greater than one-half the length of the blanks so that, as the leading edges of the blanks approach the backstop, the blanks will pivot around the center roller 25 and be supported on the portion of the belts between the center roller 25 and the backstop 34. On the other hand, such distance must be less than the overall length of each blank. This is necessary so that the trailing portion of the blanks 26a–e overhangs the portion of the belts between the center roller 25 and the slitter 20. By such positioning, when one set of blanks 26a–e is stopped by the backstop 34, the trailing ends of said blanks will be held above the surface of the belts 23 because of the hump caused by the roller 25. When the next set of blanks is transferred from the slitter 20 to the belts 23, their respective leading edges will contact that portion of the belts between the roller 25 and the slitter 20, thereby causing such leading edges to be directed under the raised trailing edges of the preceding blanks. The belts 23 may be surfaced with any preferred material which will cause the friction between the belts 23 and the blanks to be greater than the friction between the respective blanks. As a result, each succeeding set of blanks is caused to progress forward to the backstop underneath the preceding sets of blanks. In a similar manner successive sets of blanks are caused to be fed under the preceding sets of being-stacked blanks until the predetermined number passing under the brackets have been stacked.

Unloader

Figure 2:
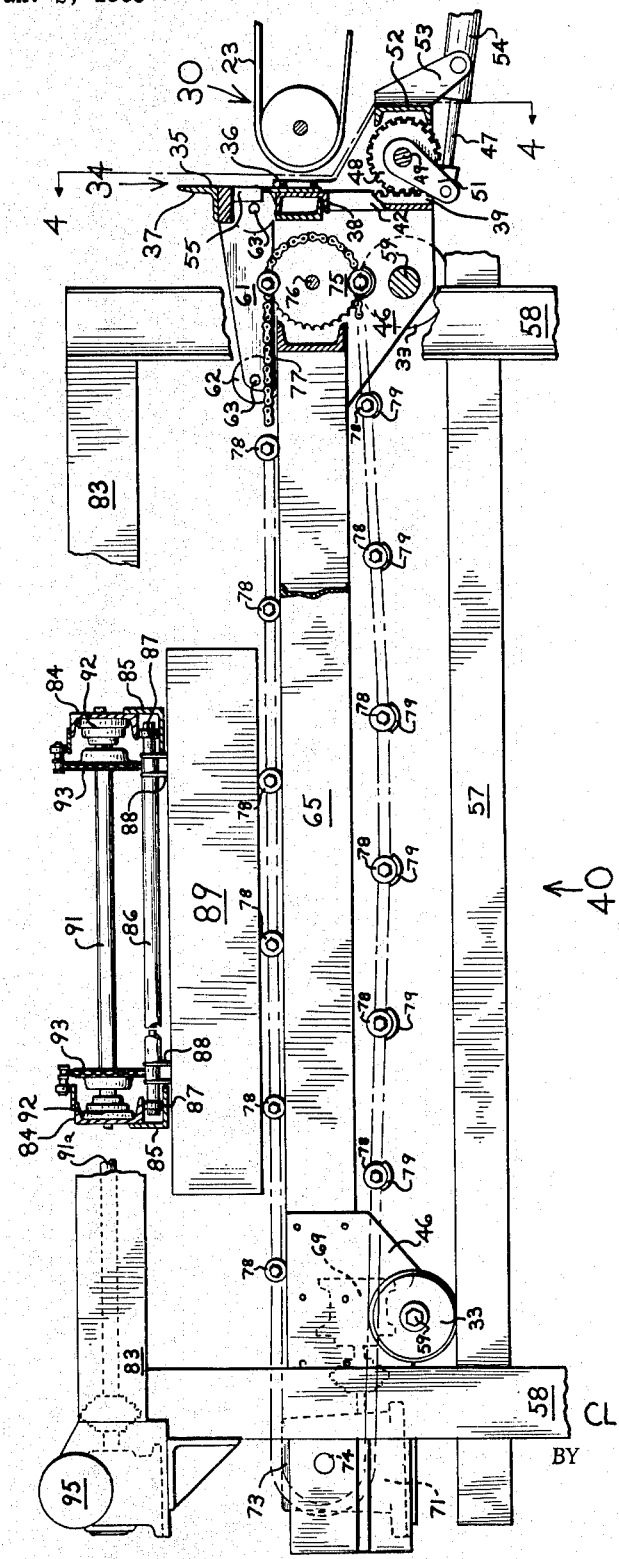
FIG. 2 is an elevational view of the unloader portion of the apparatus of this invention.
Figure 3:
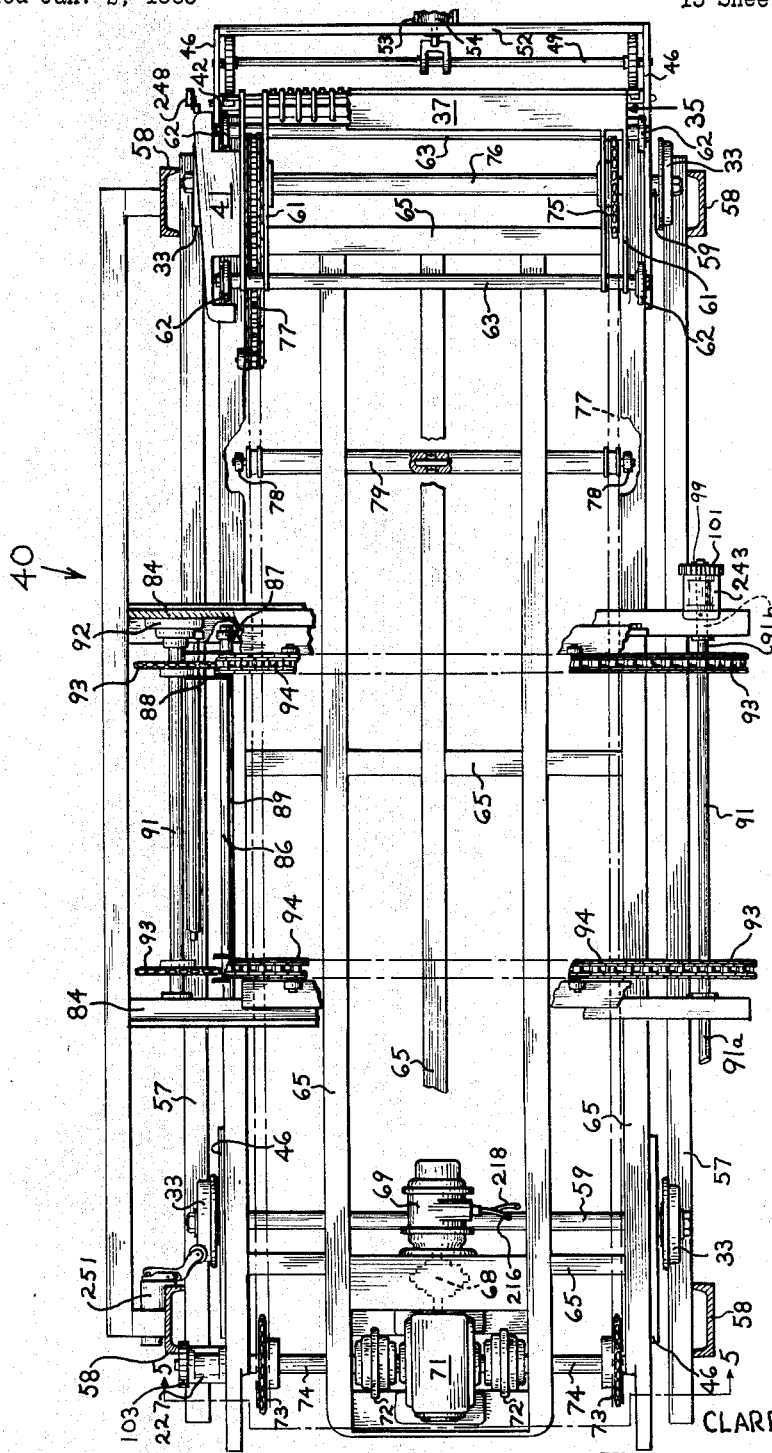
FIG. 3 is a plan view of the unloader.
Figure 4:
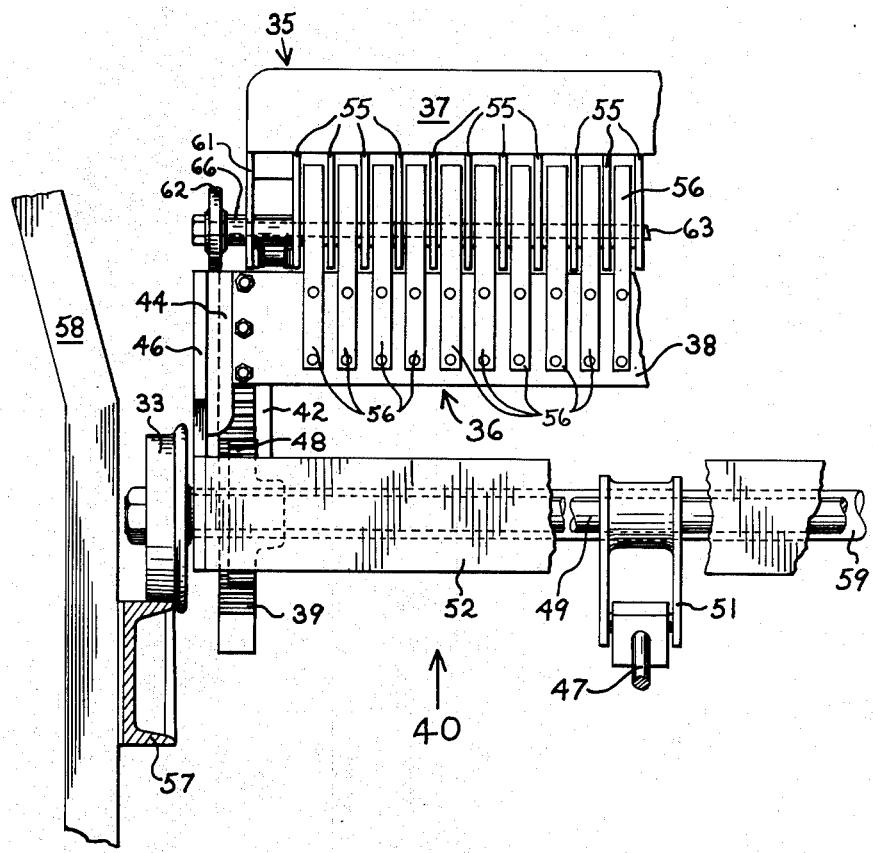
FIG. 4 is a cross-sectional view taken through line 4—4 of FIG. 2.

Referring now to FIGS. 2, 3 and 4, there is shown in detail the unloader 40 for transferring the bundles of stacked blanks from the underfeed stacker 30 to the uprighter 50. The unloader 40 comprises a plurality of upright structural members 58 having horizontal channel members 57 secured thereto. The lower part of the unloader is supported on wheels 33 riding on the longitudinal (with respect to the underfeed stacker 30) horizontal channel members. This lower part carries the backstop 34 and may be moved toward or away from the underfeed stacker as required by the lengths of the blanks 26a–e being handled. The lower part has a network of horizontal structural members 65 (FIG. 3) forming substantially a rectangle. The network is supported near each corner by plates 46 connected between the outermost of the longitudinal (with respect to flow of bundles from the underfeed stacker 30) structural members 65 and a pair of axles 59, one at each end of the network. The axles are connected to the wheels 33.

As previously noted, the underfeed stacker is provided with a backstop 34 which cooperates with the underfeed stacker 30 to stack the blanks into bundles. The backstop 34 has an upper portion 35 and a lower portion 36. Each of the portions 35 and 36 has vertically extending spaced apart fingers 55 and 56, respectively, which interlace when the backstop is closed. Each set of fingers 55 and 56 is capable by itself of preventing the flow of bundles.

The lower portion 36 is designed to be moved downwardly below the plane in which the stacked bundles are traveling to permit the bundles to move over the top of the fingers 56. The lower portion 36 comprises a transverse channel member 38 having attached at either end thereof a downwardly extending rack member 39. Each of the rack members 39 is maintained in slidable engagement with a U-shaped member 42 and is held in position therewith by one leg of an angle 44. Each of the U-shaped members 42 and each of the angles 44 is supported by the plates 46, one of which is positioned just past each end of the channel member 38. Operatively engaged with each of the rack members 39 is a gear 48. The gears 48 are connected for rotation with a common shaft 49 which is supported at either end to the plate 46 by pillow block bearings (not shown). Also connected to and supported by the plates 46 is a second channel member 52 which supports a bracket 53, having a fluid pressure cylinder 54 pivotally connected thereto. The cylinder 54 operates to reciprocally move a piston rod 47 extending from one end. There is provided a yoke 51 having one end rigidly secured to the shaft 49 and the other end pivotally connected to the free end of the piston rod 47. Retraction or extension of the rod 47 by the cylinder 54 causes the shaft and thus the gears 48 to rotate. Such rotation in turn either lowers or raises the rack members 39 and the channel member 38 connected thereto. Thus, as may be seen in FIG. 2, retraction of the rod rotates the gears 48 counterclockwise, thereby causing the lower portion 36 of the backstop 34 to be lowered.

As previously noted, the lower portion 36 is provided with vertical fingers 56. These are connected to the channel member 38 and extend upwardly therefrom. As will become clear from the description of the operation, it is these fingers 56 which serve to initially stop the being-stacked bundles from the underfeed stacker.

In contrast to the lower portion 36 moving downwardly, the upper portion 35 is designed to move horizontally with the stacked bundles away from the underfeed stacker 30. The upper portion 35 comprises a transversely disposed angle member 37 supported at each end on a movable carriage 61. Fingers 55 (FIG. 4) are secured to and extend downwardly from angle member 37. The fingers 55 are so spaced with respect to the fingers 56 of the lower portion 36 that the resepctive sets of fingers will be interlaced when the carriage 61 is forward and the lower portion 36 is raised. The carriage 61 is supported on a pair of transversely disposed axles 63, each of which has wheels 62 connected to either end by means of bushings 66. The wheels 62 ride on the outer of the longitudinal structural members 65. The carriage 61 has a cam 41 connected thereto. The cam engages a limit switch 248 when the carriage 61 is in its forward position and engages an actuating lever of an exhaust valve 251 when the carriage is in its rearmost position. The function of the switch and the exhaust valve will become apparent from the description of the pneumatic system which will follow subsequently.

At the end of the unloader 40 away from the underfeed stacker 30 there is provided power means including an air motor 69 having a gear reducer 71 connected thereto by means of a coupling 68. The motor 69 and gear reducer 71 may be supported by any desired means to the structural network of the unloader. The air motor is operated by pressured air flowing through one of the lines 216, 218 connected thereto. The direction of rotation of the air motor may be varied by alternating the air flow from one line to the other.

Figure 5:
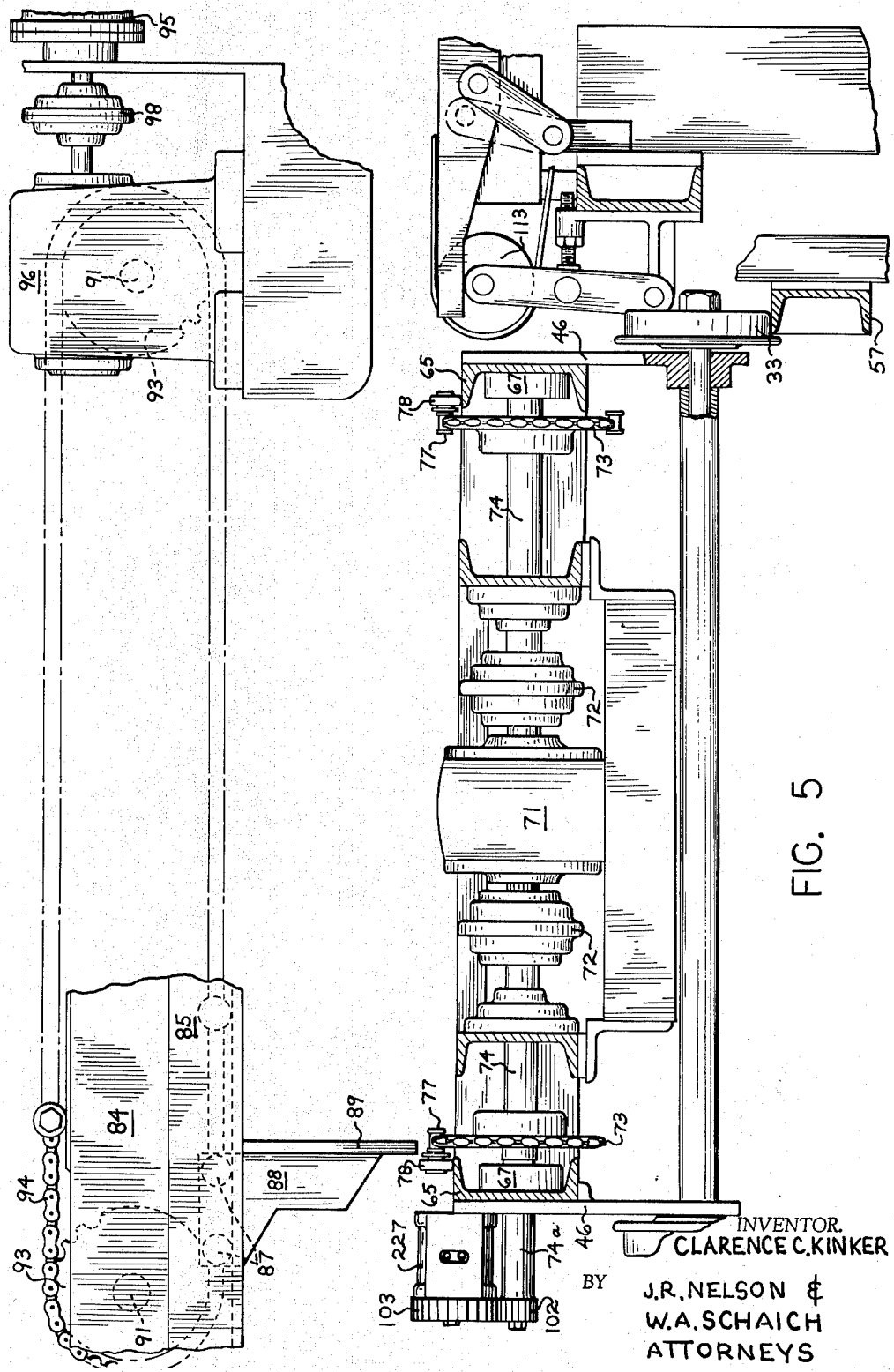
FIG. 5 is a cross-sectional view taken through line 5—5 of FIG. 3.

A pair of sprockets 73 are positioned one on each side of the gear reducer 71. Each of the sprockets 73 has a stub shaft 74 connected to the gear reducer by couplings 72. The stub shafts 74 are secured to the outer structural members 65 by means of bearings 67. One of the stub shafts 74 (the left one in FIG. 5) is provided with an extension 74a having a pinion gear 102 mounted for rotation therewith. The pinion 102 engages a gear 103 of a single port exhaust valve 227. Exhaust from the air motor 69 is directed through said valve 227 during that phase of the cycle when the air motor is receiving pressured air through line 218 and exhausting it through line 216 so that it is rotating to carry the carriage 61 toward the underfeed stacker 30. When the cycle is reversed, so that the carriage is being carried away from the underfeed stacker, exhaust from the air motor 69 is directed through valve 251. This will be covered more fully in the description of the pneumatic system which will follow subsequently.

At the underfeed stacker end of the unloader 40 are another pair of sprockets 75. The forward sprockets 75 are rotatably supported on a shaft 76 connected by means of a bearing (not shown) to the plate 46. Each of the forward sprockets 75 is aligned with one of the sprockets 73. Each of the respective sets of aligned sprockets 73 and 75 has a chain 77 reeved therearound. The chains 77 are connected to the carriage 61. Accordingly, movement of the chain 77 causes the carriage 61 and thus the upper portion 35 of the backstop to move. Each of the chains 77 has support wheels 78 spaced periodically therearound. These support wheels 78 when in the upper half of the cycle, are adapted to ride upon the outer structural members 65. As a result, the wheels 78 serve to support the upper reach of the chain in substantially a horizontal plane. There are provided a plurality of laterally extending supporting bars 79 which are connected to and supported by oppositely aligned wheels 78 of the respective chains 77. The purpose of these supporting bars 79 is to support the stacked bundles during their movement through the unloader. Accordingly, bars 79 are provided for only one-half of the loop defined by the endless chains 77. As shown in FIG. 2, when the carriage 61 and the upper portion 35 of the back-stop are forward (toward the underfeed stacker 30), the bars 79 are positioned on the lower reach of the chains 77. Rotation of the sprockets 75 in a counterclockwise direction moves the upper portion 35 of the backstop 34 and the stacked bundles onto the unloader 40 (provided, of course, the lower portion of the backstop is down). The bars 79 travel around the sprockets 75 to the upper reach of the chains 77 where they successively engage and support said bundles.

The upper part of the unloader 40 has a network of upper structural members 83 supported on the upright structural members 58 above the upper portion 35 of the backstop 34 a sufficient distance that it will not interfere with the movement of said upper portion on the carriage 61. The upper structural members 83 carry a pair of parallel channel members 84 which extend transversely of the direction of travel of the carriage 61. Each of the channels 84 has an angle member 85 secured thereto. A pair of shafts 86 extends between the angle members 85 and have wheels 87 on each end which ride on the upper face of the angle members. Secured to the shafts 86 is a dolly 88 carrying a pusher plate 89. Near each end of the channel members 84 there is provided a shaft 91 which spans the distance between the respective channel members 84 and which is supported in bearings 92. Each shaft has a pair of sprockets 93 secured thereto. A pair of chains 94 are reeved around the respective pairs of aligned sprockets 93 in a conventional fashion. The dolly 88 is connected to each of the chains 94 so that movement of the chain causes the dolly and the pusher plate to move and thereby push the group of bundles (five bundles by virtue of the number of slitters shown in FIG. 1) off of the bars 79 of the unloader 40 onto the uprighter 50.

Power to move the chain is provided by an air motor 95 connected to a gear reducer 96 by means of a coupling 98. The gear reducer 96 is connected to an extension 91a of the forward (with respect to the uprighter) of the shafts 91. The forward of the shafts 91 also has another extension 91b having a pinion gear 99 secured for rotation therewith. The pinion gear 99 engages a gear 101 of a double port exhaust valve 243. Exhaust from air motor 95 is directed through the exhaust valve 243.

*Uprighter*

Referring now to FIGS. 6–10, the uprighter 50 comprises a plurality of vertical supporting members 110 having connected thereto a network of horizontal supporting members 111. There is provided a plurality of continuously moving conveyor belts 112 reeved around pulleys 113 at either end of the uprighter 50. The upper portion of the belts 112 ride upon the surface of the horizontal supporting members 111 to provide a flat surface on which the bundles may be conveyed. The pulleys 113 furthest removed from the unloader 40 are mounted for rotation with shaft 120 which extends laterally of the uprighter. The shaft 120 rotates in bearing blocks 121 which are secured to the structural members by any desired means. The pulleys 113 at the end of the uprighter near the unloader are mounted on individual stub shafts 124. The shafts 124 are supported in one end of arms 122. The other end of the arms 122 are pivotally connected to one of the structural members. An expandable bolt 123 is positioned between the structural members and the center of each of the arms 122. Any slack in the belts 112 may be taken up by expanding the bolts 123 to move the pulleys 113 at the unloader end of the uprighter away from the pulleys at the other end.

Rotation of the shafts 120 is powered by means of a motor 114 connected by means of a coupling 124 to a gear reducer 115. The gear reducer has a sprocket 116 connected to the shaft thereof. A chain 118 is reeved around the sprocket 116 of the gear reducer and a second sprocket 117 which is connected to the shaft 120 (see FIGS. 7 and 8). The motor 114 operates to continuously move the belts 112 during operation of the sheet handling apparatus.

Near the end of the conveyor belts 112 there is provided mechanism for turning individual stacked bundles so that each of the slitted blanks of cardboard rests upon its longitudinal edge. The mechanism includes a laterally extending shaft 132 supported on bearings 131 which lie in a plane slightly below the upper surface of the conveyor belts 112. Secured to the shaft 132 are a plurality of shaped plates 133 mounted on hubs 134. Each of the plates is formed with four arms 135 at right angles to one another. A single stacked bundle is moved by the conveyor belts until it overlies the upper edge of the forward horizontal arm and continues until it contacts the forward edge of the vertical arm which prevents further movement of the bundle. The shaft and thus the plate is then caused, by means hereinafter described, to rotate in a counterclockwise direction as viewed in FIG. 7, thereby turning said bundle so that the individual blanks thereof rest on their respective longitudinal edges. To hold the sheets on edge, each of the arms 135 is provided with an outwardly extending finger 136. If desired, a series of backstop plates 125 may be provided to assist in holding the blanks on edge.

Since the bundles are upended one at a time, it is obvious that no bundle should be moving into the arms 135 until the previous bundle has been upended and trailing finger 136 is out of the way. Mechanism is provided to insure that no bundles move into the arms 135 until the proper time. This mechanism includes a pair of gates 140 positioned between conveyor belts 112 and mounted for movement from a lowered position below the conveyor belts 112 to a raised position above the belts (FIGS. 7 and 9) where they act to prevent movement of any bundles. The gates 140 are supported by brackets 141 which are rigidly secured to a rotatable shaft 142. Partial rotation of the shaft to move the gates 140 between a raised and a lowered position is effected by means of a fluid pressure cylinder 144 having the free end of its position rod pivotally connected to a crank 145 which is secured to the shaft 142. The cylinder 144 is pivotally supported by any desired means. The gates 140, when raised, prevent the movement of stacked bundles into the cross-arms 135 of the uprighter.

Lowering of the gates 140 by retraction of the cylinder permits stacked blanks to enter the cross-arms. However, as previously noted, inasmuch as the bundles are turned so that the individual sheets rest on their respective edges, it is necessary that only a single stacked bundle of the group (five as previously described) be permitted to enter the cross-arms of the uprighter at a time, and that the other bundles in the group be held back until the first bundle has been turned. Mechanism for holding back the trailing bundles is hereinafter described.

Figure 6:
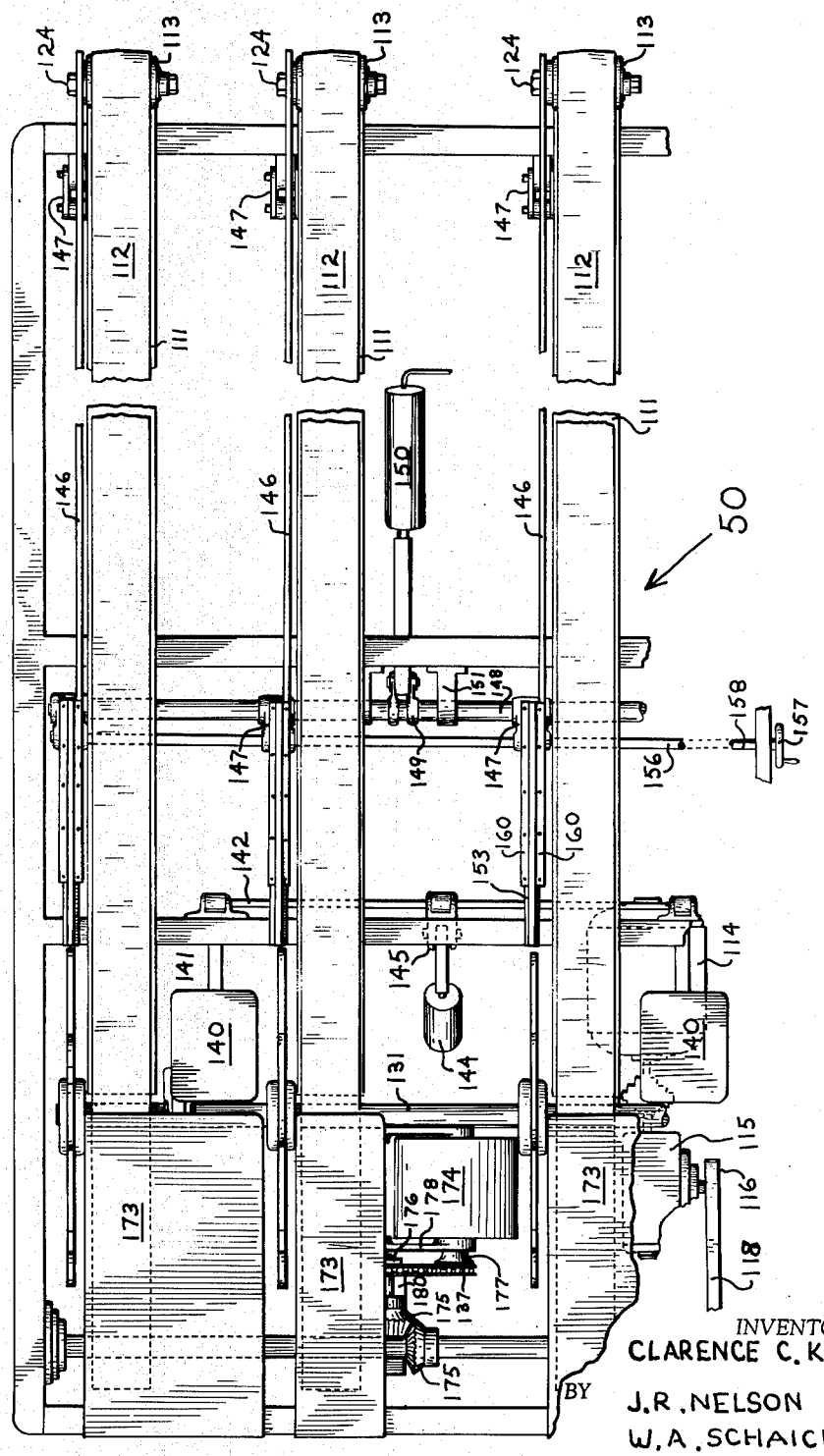
FIG. 6 is a plan view of the uprighter.
Figure 7:
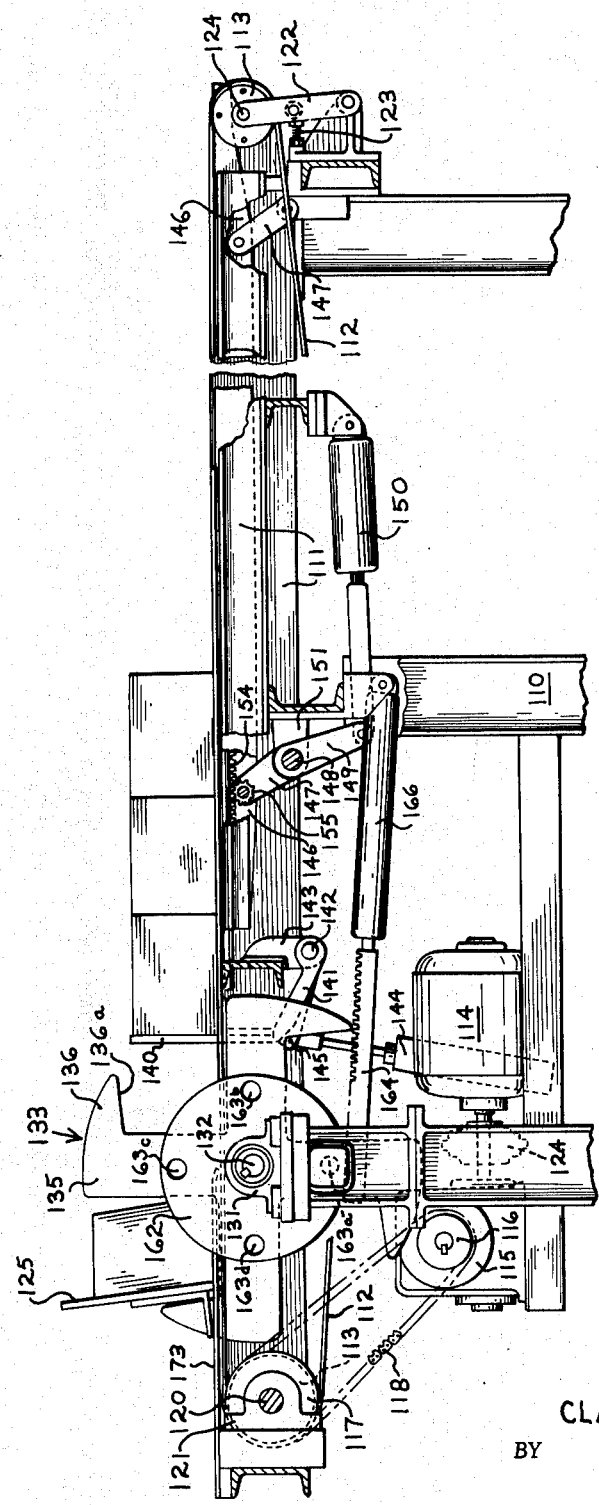
FIG. 7 is an elevational view of the uprighter.
Figure 8:
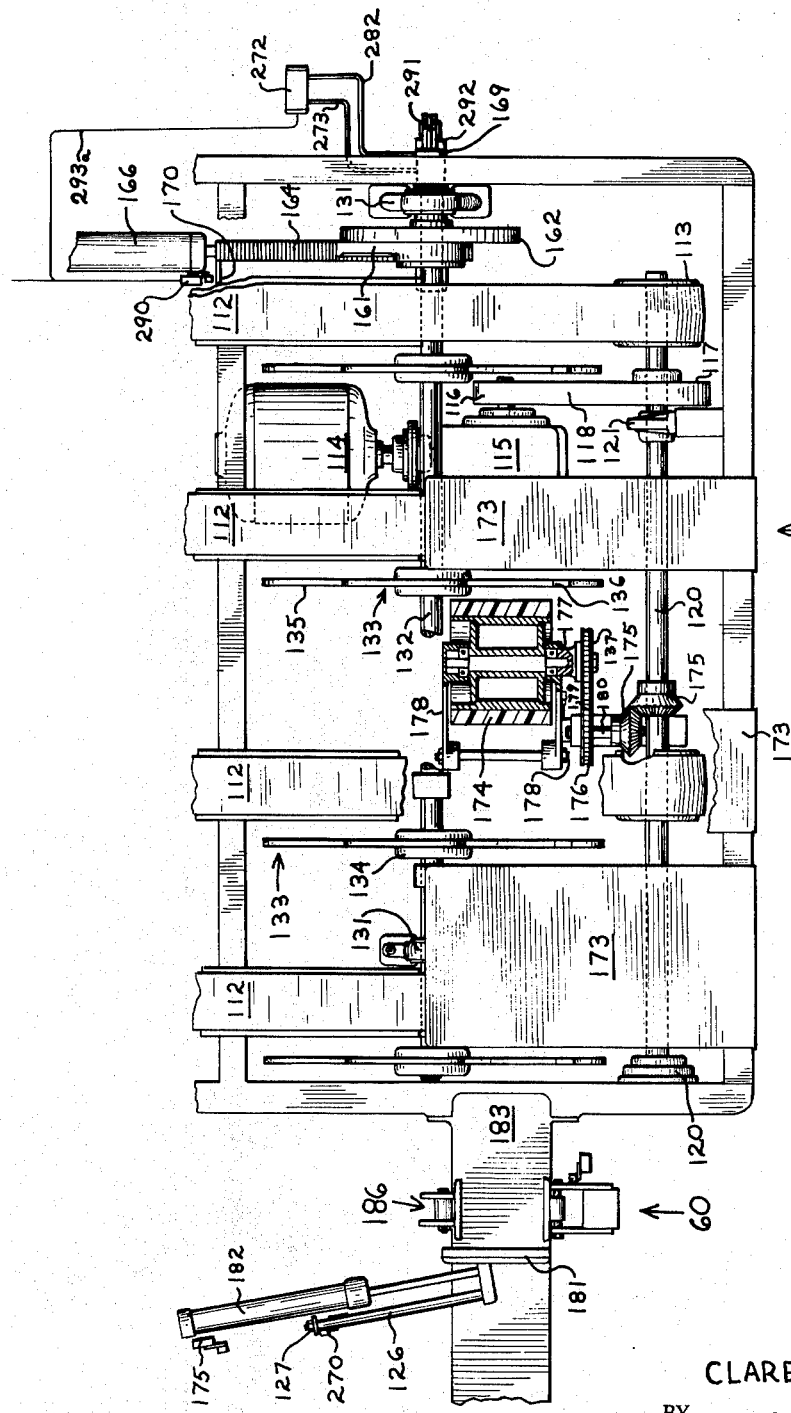
FIG. 8 is a detailed plan view of one end of the uprighter showing the mechanism for turning the bundles and for removing the edge-turned bundles from the uprighter.
Figure 9:
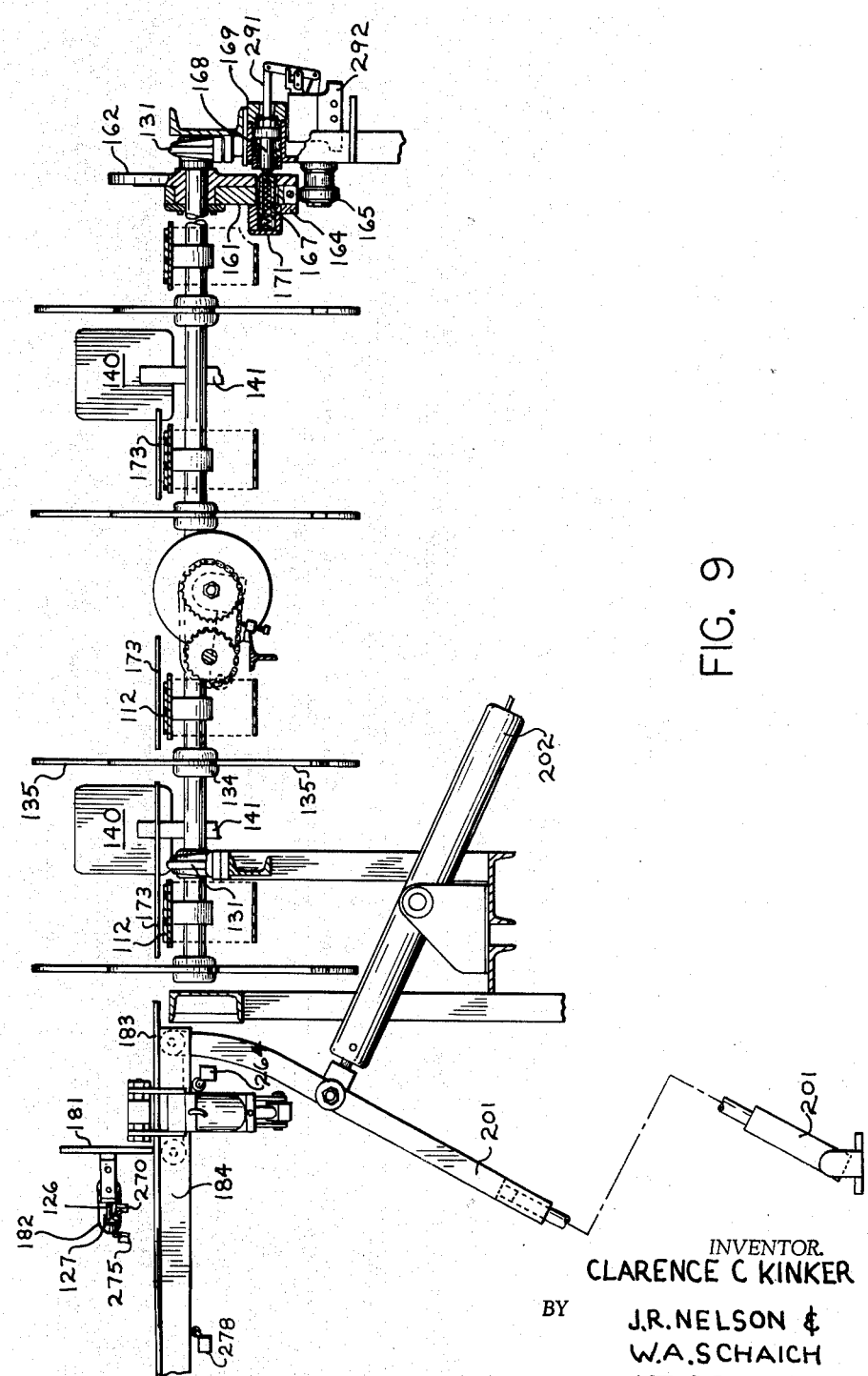
FIG. 9 is the end elevational view of the mechanism shown in FIG. 8.
Figure 10:
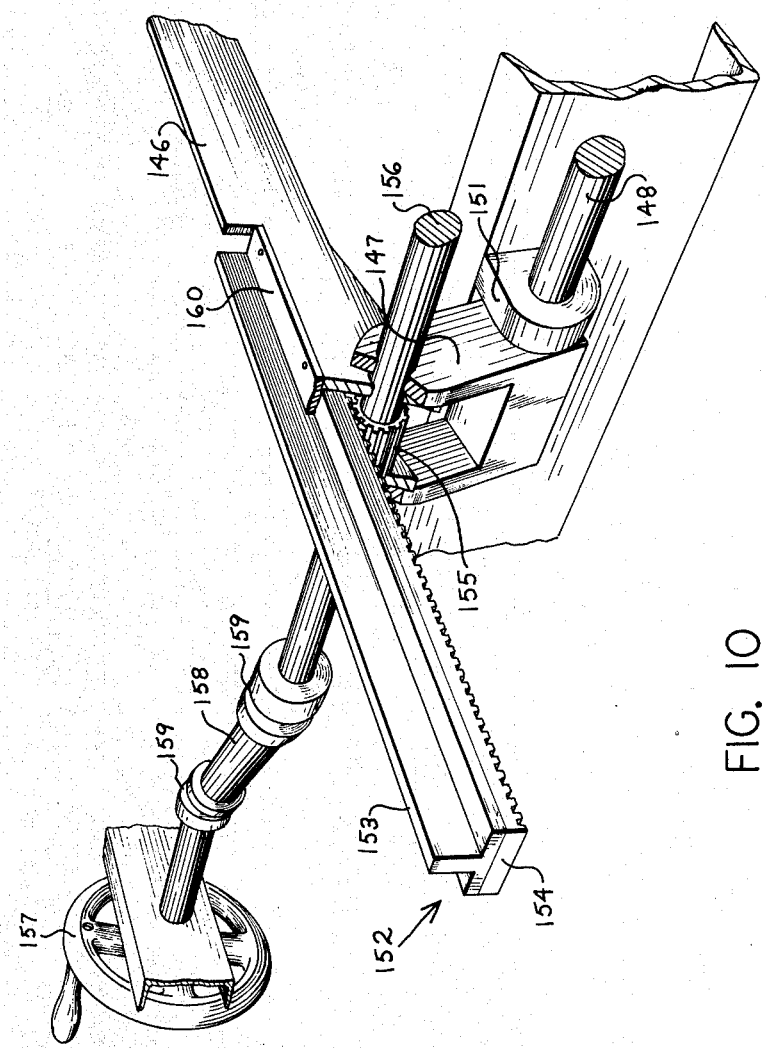
FIG. 10 is a perspective view of the uprighter adjusting mechanism.

Referring particularly to FIGS. 6, 7, and 10, the mechanism for insuring that only a single stacked bundle is moved into the cross-arms 135 when the gate 140 is lowered includes a plurality of longitudinally extending bars 146, one positioned beside each of the conveyor belts 112 parallel thereto. The bars are mounted for movement between a raised position above the surface of the conveyor belts and a lowered position below the surface of the conveyor belts. Each of the bars 146 is supported near its ends on a pair of parallel motion arms 147. The rearmost (toward unloader 40) of the parallel motion bars 147 are pivotally supported to any desired structural member. The parallel motion arms 147 located near the forward end of the bars 146 are rigidly secured to a rotatable shaft 148. The shaft 148 is supported by bearing blocks 151 secured to one of the horizontal structural members. Partial rotation of the shaft 148 is effected by means of a fluid pressure cylinder 150 having the free end of its piston rod pivotally connected to a crank 149 which is rigidly secured to the rotatable shaft 148. For the stage of the operation as shown in FIG. 7 the parallel motion arms 147 are angled slightly forward so that the bars 146 are lowered with their top surfaces lying below the plane of the conveyor belts 112. Activation of the cylinder 150 causes its piston rod to extend against the crank 149, thereby partially rotating the shaft 148 in a clockwise direction. This causes the parallel motion arms 147 to move from their angled forward position of FIG. 7 to a nearly vertical position, thereby raising the bars 146 so that their upper surfaces lie in a plane which is higher than that of the conveyor belts 112. In this manner any bundles over the bars 146 are prevented from moving forward even though the gate 140 is lowered and the belts 112 continue to move. As will become apparent from description of the pneumatic system, the operation of the gates 140 and the bars 146 is so synchronized that the bars are lowered when the gates are raised and vice versa.

As previously noted, it is desired that a single stacked bundle enter the cross-arms 135 upon lowering of the gate 140. Inasmuch as the widths of the bundles may vary depending on the spacing between the slitters 19a–e (FIG. 1), it is necessary that the distance between the raised gates 140 and the leading edge of the bars 146 be substantially the width of a single bundle. The apparatus of the present invention is adapted to process bundles of varying widths; accordingly, there is provided means for adjusting this distance (see FIG. 10). Each of the bars 146 is provided with an extension 152 operably engaged therewith for raising and lowering with the bar 146. The extension 152 comprises an inverted T-member 153 positioned so that its upper surface is in the same plane as the upper edge of the bars 146. The inverted T-member 153 is held in position by a pair of plates 160, one on each side of the upright portion thereof (see also FIG. 6). Secured to the lower face of the inverted T-member 153 is a rack member 154. The rack 154 is engaged by a pinion gear 155 secured to a rotatable shaft 156. Rotation of the pinion gear 155 by means of shaft 156 extends or retracts the inverted T-member depending on direction of rotation. A manually rotatable wheel 157 is connected to the shaft 156 by means of a pair of stub shafts 158 and a pair of knuckle couplings 159. The outer stub shaft 158 is supported on one of the structural members by any desired means. The knuckle coupling connection between the wheel 157 and the shaft 156 permits the required movement of the shaft 156 when the parallel motion arms 147 are moved.

After a single stacked bundle has entered the cross-arms 135, it is upended by rotating the shaft 132 carrying the plates 133 and their respective cross-arms 135 a full 90°. Mechanism for accomplishing such rotation includes a drive plate 162 mounted on one end of the shaft 132. The drive plate 162 has four holes 163a–d spaced at 90° intervals near the periphery of the plate. Juxtapositioned with the inside face of the drive plate is a quadrant member 161. The quadrant member has a substantially 90° pie-shaped configuration and has gear teeth around its arcuate edge. The quadrant is supported on the hub of the drive plate 162 and may rotate thereon (see FIG. 9). There is provided a rack member 164 having teeth adapted to engage the teeth of the quadrant 161. Movement of the rack is effected by a fluid pressure cylinder 166 having the free end of its piston rod connected thereto. Vertical support for the rack is provided by a support member 165 upon which the rack rides. A housing 171 secured to the quadrant 161 carries a spring loaded pin 167 which is adapted to successively engage each of the holes 163a–d of the drive plate 162. The spring acts to urge the pin 167 outwardly so that it normally engages one of the holes 163a–d. Thus, in FIG. 9 the pin 167 is engaging the lower hole 163a. The pin 167 initially became engaged with its present hole 163a when it was 90° away, where hole 163d (FIG. 7) is presently located. At that time the rack was extended. Retraction of the rack 164 by the cylinder 166 caused the quadrant 161 to rotate in a counterclockwise direction (as viewed in FIG. 7). By virtue of the fact that the pin 167 was engaged with the hole of the drive plate 162, the plate was also caused to rotate 90°, as was the shaft 132 and the cross-arms carrying the single bundle. This in turn rotated the bundle so that the individual sheets thereof rest on their respective edges.

After the quadrant has been rotated 90° counterclockwise, it is necessary to disengage the pin 167 from the hole so that the rack 164 may be extended to rotate the quadrant clockwise without rotating the plate 162 and the shaft 132. To accomplish this there is provided a fluid pressure cylinder 169 carrying a lock pin 168 on the end thereof. The cylinder 169 is positioned so that the lock pin is aligned with the lower hole 163a of the plate 162. A limit switch 290 (FIG. 8) is positioned for engagement by a finger 170 extending from rack 164 upon completion of retraction of the rack 164. As will become clear from the description of the pneumatic system, this opens a valve 272 permitting pressured air to flow to the rear of cylinder 169 to thereby extend the lock pin 168 to push the pin 167 out of the hole of the drive plate 162. It is then possible for the rack to be extended, thereby moving the quadrant clockwise without causing rotation of the drive plate 162. Full extension of the rack 164 causes the pin 167 to become aligned with hole 163d where it is urged by the spring to engage said hole. The mechanism is now in position to again rotate the cross-arms 135 upon retraction of the rack 164.

Near the end of the uprighter positioned above the belts 112 are a plurality of horizontal plates 173 to support the respective edge-turned blanks. A continuously rotating rubber surfaced wheel 174 is positioned between two of the plates 173 so that its upper surface is slightly above the upper surface of the plates. The rubber surfaced wheel thus engages the edges of the respective sheets and urges them laterally (to the left as viewed in FIG. 8) off the uprighter 50.

The wheel 174 is mounted on a shaft 177 supported by a pivoted bracket 178. Continuous rotation is effected by the pair of bevel gears 175, one connected to the continuously rotating shaft 120 carrying the pulleys of the conveyor belts 112 and the other connected to a shaft 180 having a sprocket 176 mounted thereon. The shaft 177 carrying the wheel 174 has a sprocket 137 secured to its end in alignment with sprocket 176. A chain 179 is reeved between the sprockets 137 and 176. Accordingly, continuous rotation of the shaft 120 causes continuous rotation of the wheel 174.

Thus, the edge-turned blanks are urged laterally off the uprighter 50 by continuous rotation of the wheel 174. However, complete movement off the uprighter is retarded by a gate 181 which serves to align the ends of the respective blanks. The gate 181 is mounted on the free end of the piston rod of a fluid pressure cylinder 182. A rod 126 having a finger 127 depending therefrom is mounted for movement with the piston rod of the cylinder 182. The finger 127 engages and thereby actuates one limit switch 270 when extended and another, 275, when retracted. There is provided a plate 183 connected to a pair of angle irons 184 to support the edge-turned sheets as they leave the uprighter. It is while the blanks are stopped by the gate 181 that they are engaged by the clamp 60.

*Clamp*

Figure 11:
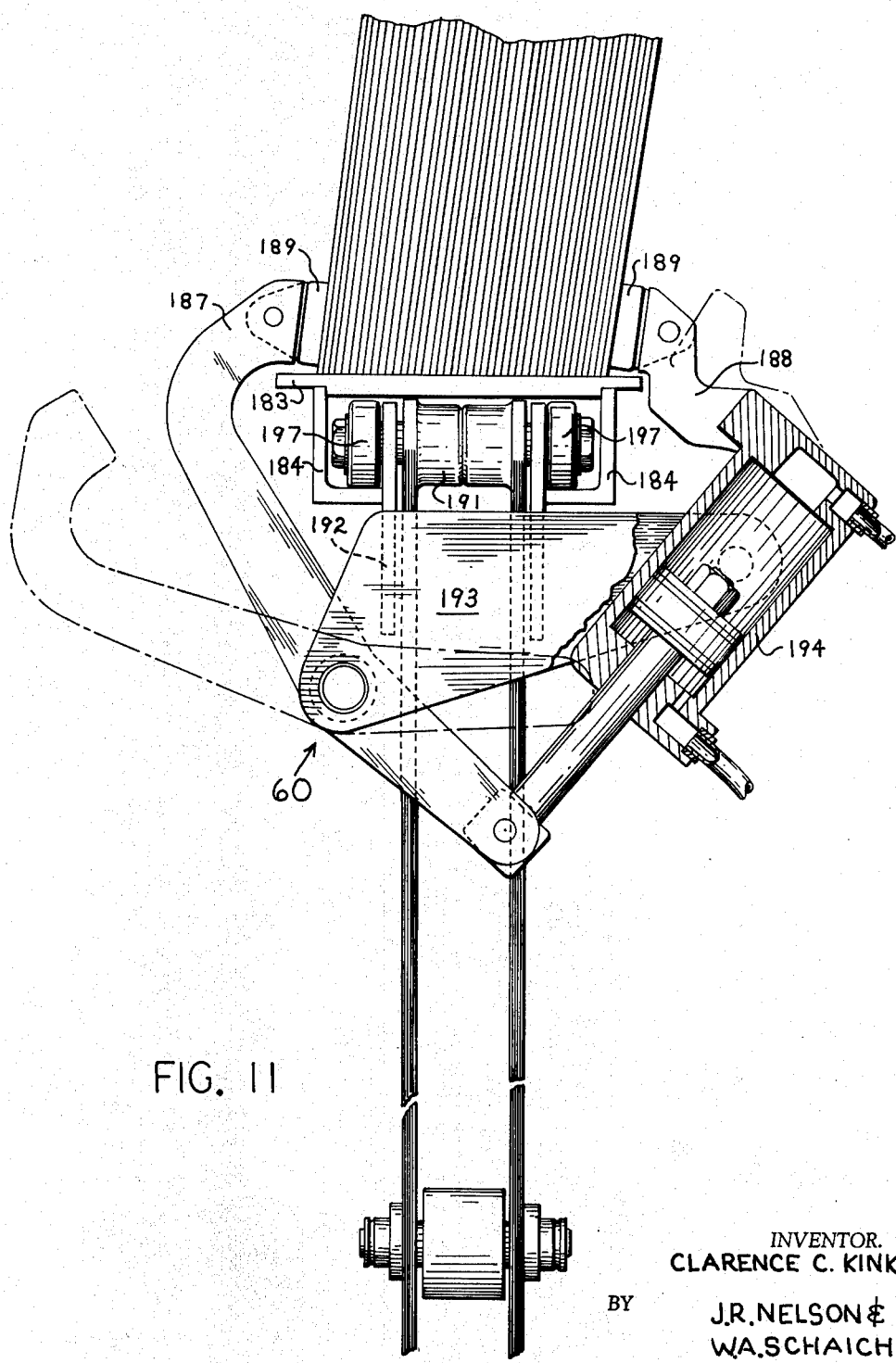
FIGS. 11 and 12 are detailed elevational views of the clamping mechanism which transfers edge-turned bundles to the saw.
Figure 12:
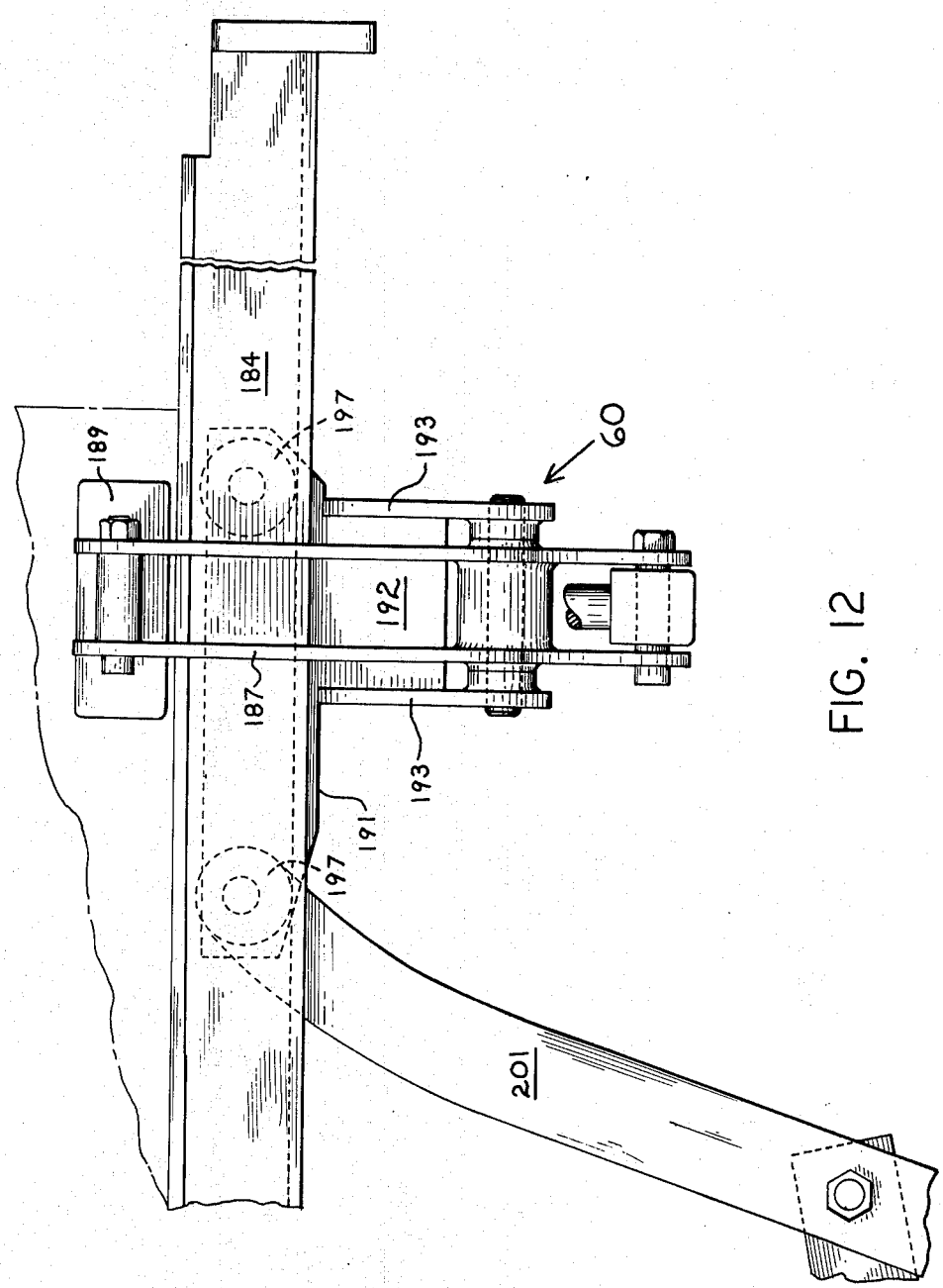

The clamp 60, shown in detail in FIGS. 11 and 12, comprises a pair of arms 187 and 188, each carrying a bundle engaging plate 189 on the free end thereof. A fluid pressure cylinder 194 has one end rigidly connected to arm 188 and has the free end of its piston rod pivotally connected to arm 187. The cylinder 194 operates to extend its piston rod to close the clamp or retract the rod and open the clamp (shown in phantom lines in FIG. 11). Inasmuch as the cylinder 194 acts as a portion of one arm of the clamp, it, as well as the arm 187, must be free to pivot. Accordingly, the cylinder 194 is pivotally supported between one end of a pair of plates 193 and the arm 187 is pivotally supported between the other end. The plates 193 are supported on a dolly 191 adapted to move the clamp 60 from the uprighter 50 toward the saw 70. The dolly 191 is carried on wheels 197 which ride on the horizontal legs of the angle irons 184. The sides of the dolly have downwardly extending portions 192 to which the plates 193 are rigidly secured.

Means for moving the dolly 191 from the gate 181 toward the saw 70 include a telescoping bar 201 having one end pivotally connected to the dolly and the other end pivotally connected to the floor. A fluid pressure cylinder 202 (FIG. 9) has the free end of its piston rod pivotally connected to the bar 201. The cylinder 202 may be supported by any desired structural means. Extension of its piston rod by the cylinder 202 causes the bar 201 to pivot around its floor support so that the upper end carries the dolly 191 to the left as viewed in FIG. 9. By virtue of the fact that the bar 201 has telescoping sections, the end connected to the dolly 191 is permitted to remain in the plane determined by the horizontal legs of the angle irons even though it pivots around a fixed point at the other end.

A pair of limit switches 264 and 278 are mounted in the path of travel of the clamp 80. Switch 264 is engaged by the plate 193 as the dolly 191 reaches the end of its movement toward the uprighter 60. Switch 278 is engaged by the plate as the dolly reaches the end of its movement away from the uprighter. The effect of such engagement will become apparent from the description of the pneumatic system which follows.

*Pneumatic system*

The apparatus of the present invention is provided with two pneumatic systems. The first handles the operation of the unloader 40, while the second handles the operation of the uprighter 50 and the feeder clamps 60.

The pneumatic system for the unloader 40 comprises a control valve 206 for controlling the flow of pressured fluid to the fluid pressure cylinder 54 which controls the raising and lowering of the lower portion 36 of the backstop 34. The valve 206 receives pressured air from a supply source (not shown) and directs it either through line 207 to the rear of the cylinder 54 to cause the cylinder to extend its piston rod, or through line 208 to the forward end of such cylinder to cause it to retract its piston rod. The valve 206 has a solenoid 206a at one end which controls the opening of the port leading to line 208 and a second solenoid 206b which controls the opening of the port to line 207. The solenoid 206a is actuated by an impulse received through wire 203. The impulse through wire 203 to open the port to line 208 is controlled by the counting means which measures the number of sheets flowing under the brackets 12 (FIG. 1). Impulse to the solenoid 206b to open the port leading to line 207 is received through wire 232a which is connected by wire 232 to a limit switch 230. The limit switch 230 is adapted to be engaged by the carriage 61 as said carriage nears the end of its rearward movement with the upper portion 35 of the backstop 34. Such engagement activates the limit switch 230 thereby transmitting an impulse through wires 232 and 232a to solenoid 206b.

The wire 232 from the limit switch 230 leads to a solenoid 231a of sweep-off control valve 231. An impulse sent through wire 232 to solenoid 231a actuates the valve 231 to open the port leading to line 245 to permit pressured air from a supply source to flow to the air motor 95. Pressured air flowing through line 245 to the air motor 95 causes the air motor to rotate in a direction which will move the pusher plate 89 toward the uprighter 50. When the motor 95 is powered by pressured air flowing through line 245, its exhaust flows out line 235 through the valve 231 to a connecting line 250 to the double port exhaust valve 243. The purpose of directing exhaust air from the motor 95 through the exhaust valve 243 rather than directly to the atmosphere is to provide a controlled deceleration for the pusher plate carriage 88 as it nears the end of its stroke toward and away from the uprighter 50. As will become apparent from the detailed description of the exhaust valve 243, the motor 95 is automatically stopped by closing of the exhaust valve after a predetermined amount of motor rotation. After being stopped by closing of the exhaust valve, the motor remains idle until caused to rotate in the opposite direction.

Reversal of direction of rotation of the motor 95 is effected when an impulse is received from limit switch 248 through wire 249 to a second solenoid 231b secured to the valve 231. This impulse opens the port leading to line 235 to permit the pressured fluid to flow through that line to the air motor 95, thereby causing the motor to rotate in the opposite direction to move the carriage 88 back to its original position. In that instance the exhaust flows through line 245 to the valve and then to connecting line 236 to the other port of the double port exhaust valve 243. The limit switch 248 is actuated by the cam 41 riding on the carriage 61 when the carriage reaches its forward position.

As previously noted, movement of the carriage 61 is powered by the air motor 69. Actuation of the air motor 69 is provided by an impulse received from limit switch 211 so positioned as to be actuated upon retraction of the piston rod of the backstop lowering cylinder 54. Such actuation of the limit switch 211 sends an impulse through wire 213 to a first solenoid 212a of valve 212. The impulse opens the port leading to line 216, thereby permitting pressured air from a supply source to flow to air motor 69. Air through line 216 causes the motor to rotate in a direction which will move the carriage 61 from the underfeed stacker 30 toward the motor. When rotated in this direction the exhaust from the air motor 69 will flow through line 218 to the valve 212 where it is by-passed to line 217 for transmission to an exhaust valve 251.

The exhaust valve 251 is a conventional straight line valve permitting free flow of exhaust air to atmosphere while it is open. Opening and closing of the valve is controlled by an arm 252. The valve is normally open and is closed upon contact of the arm 252 by the cam 41 as the carriage nears the rear of the unloader. Closing of the exhaust valve 251 stops rotation of the air motor 69 and accordingly movement of the carriage 61. Thus means are provided for stopping the air motor 69 when the carriage 61 reaches a predetermined location on the unloader. The purpose of stopping the air motor 69 in this manner will become apparent when it is recalled that the lower part of unloader 40 is mounted on wheels 33 and may be moved away from the underfeed stacker 30 when exceptionally long panels of cardboard are to be processed. Inasmuch as the exhaust valve 251 remains fixed regardless of whether the lower part of the unloader is forward or back from the underfeed stacker, the stacked bundles will be stopped in their movement away from the underfeed stacker with their leading edges in the same position relative to the uprighter 60 whether or not said lower part is forward or back.

Impulse to reverse the direction of rotation of the air motor 69 is received from a limit switch 97 mounted for engagement by the forward shaft 86 of the pusher plate dolly 88 as the dolly nears the end of its movement toward the uprighter 50. Engagement of the limit switch sends an impulse through wire 246 connected to a second solenoid 212b of the valve 212. Such impulse opens the port to line 218 leading to the air motor 69. The flow of pressured air through line 218 causes the motor to rotate in the opposite direction to carry the upper portion of the backstop 34 on the carriage 61 back to its position near the underfeed stacker. During such rotation of the air motor the pressured air is exhausted through line 216 to the valve 212 where it is by-passed to line 214 for transmission to the single port exhaust valve 227. Except for the fact that it operates only upon reverse rotation of the air motor 69 (i.e., when the motor is moving the carriage 61 toward the underfeed stacker 30), the single port exhaust valve serves the same purpose as did the double port exhaust valve 243.

One cycle of operation of the unloader 40 will now be described. As previously noted, any preferred counting mechanism permits a predetermined number of sheets of cardboard to pass under the rocker member 15. Upon reaching this predetermined number, the counting mechanism activates the cylinders 14 to lower downwardly extending arm 17 of the rocker member 15 and prevent additional sheets of cardboard from passing thereunder. This same counting mechanism, after a suitable delay to permit the last sheet to become stacked so that its leading edge contacts the backstop 34, sends an impulse through wire 202 to the solenoid 206a. Such impulse opens the port of valve 206 leading to line 208 permitting pressured air to flow to the forward end of the fluid pressure cylinder 54, thereby causing said cylinder to retract its piston rod. Such retraction of the piston rod pulls the yoke 51 to rotate the shaft 49 and its gears 48 counterclockwise (FIG. 2) to thereby lower the lower portion 36 of the backstop 34. As the yoke 51 is moved by the piston rod, it engages the limit switch 211, thereby sending an impulse through wire 213 to the solenoid 212a. Such impulse opens the port of the valve 212 leading to line 216 permitting pressured air to flow through line 216 to the air motor 69, thereby causing the air motor to rotate in a direction which will cause the carriage 61 carrying the upper portion 35 of the backstop to move away from the underfeed stacker. Inasmuch as the lower portion 36 of the backstop 34 has been lowered out of the way, the stacked bundles are free to move with the upper portion 35 of the backstop and are so urged by the continuously moving belts 23 of the underfeed stacker 30. As previously noted and as shown in FIG. 2, the chains 77 carrying the carriage 61 also carry transverse supporting bars 79 which move around sprocket 75 to the upper reach of the chains to thereby engage the under surface of the stacked bundles, thus supporting said bundles. As the carriage 61 is moved away from the underfeed stacker and nears the end of its stroke, the cam 41 connected thereto engages the arm 252 of the exhaust valve 251 and moves said arm until the valve is completely closed. Closing of the valve 251 stops the air motor 70.

The limit switch 230 is positioned so that it will be contacted by the carriage 61 as the carriage reaches the end of its stroke. Such contact sends an impulse through wire 232 to the solenoid 231a of valve 231 and also through wire 232a to the solenoid 206b of valve 206.

The impulse to solenoid 206b opens the port of valve 206 leading to line 207, thereby permitting pressured air to flow to the rear end of the backstop lowering cylinder 54, causing said cylinder to extend its piston rod and raise the lower portion of the backstop. Thus, additional panels of cardboard are free to begin their movement through the slitter 20 and the underfeed stacker 30 while the unloader 40 is operating.

The impulse through wire 232 to solenoid 231a opens the port of valve 231 leading to line 245 permitting pressured air to flow to the air motor 95. This causes the air motor to rotate in a direction which will move the pusher plate 89 toward the uprighter 50 to thereby sweep the stacked bundles off the transverse supporting bars 79 onto the uprighter. During such rotation, exhaust from the air motor flows through line 235 to the valve 231 and out through line 250 to the double port exhaust valve 243. As previously noted, the exhaust valve 243 is designed so that it closes upon a predetermined amount of rotation, thus stopping the air motor 95. The details of this exhaust valve will be described subsequently. When the pusher plate 89 reaches the end of its stroke, its dolly shaft 86 engages limit switch 97 which sends an impulse through wire 246 to the solenoid 212b. Such impulse opens the port of valve 212 leading to line 218. Pressured air through line 218 causes the air motor 69 to rotate in the opposite direction from that previously described to thereby move the carriage 61 back toward the underfeed stacker 30. During such rotation exhaust from the motor flows through line 216 to valve 212 where it is diverted to line 214 to the single port exhaust valve 227. This single port exhaust valve is connected for rotation with the air motor 70 and permits only a predetermined amount of rotation to occur before closing to stop the air motor.

As the carriage 61 nears the underfeed stacker 30, the end of the cam 41 engages limit switch 248 causing said switch to send an impulse through wire 249 to solenoid 231b. Such impulse opens the port of valve 231 leading to line 235 permitting pressured air to flow through that line to the air motor 95. Pressured air flowing through line 235 causes the air motor 95 to rotate in the opposite direction from that previously described to thereby move the pusher plate 89 back to its original position. Exhaust from the motor 95 flows through the line 245 to the valve 231 where it is diverted through line 236 to the double port exhaust valve 243 which stops the motor 95 after a predetermined amount of rotation. Thus, the respective parts of the unloader are back in their original position.

Figure 13:
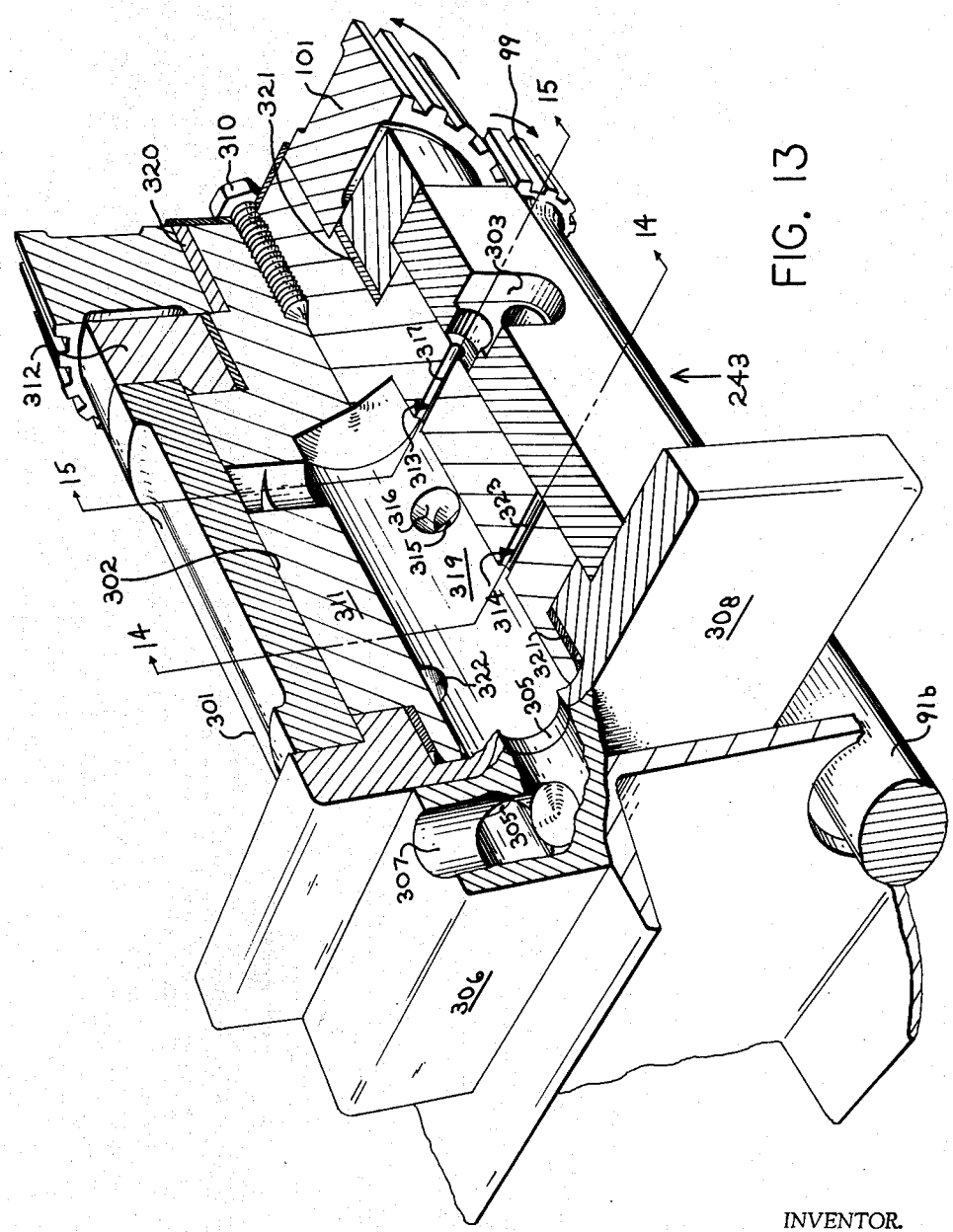
FIG. 13 is a perspective view of the double port exhaust valve of the present invention.
Figure 15:
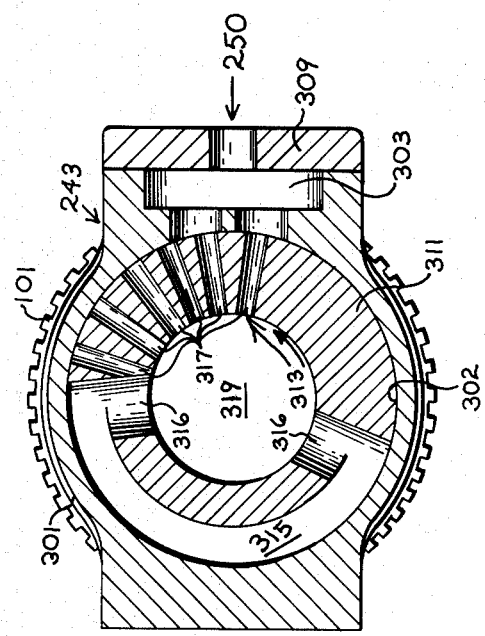
FIG. 15 is a cross-sectional view taken through line 15—15 of FIG. 13.
Figure 14:
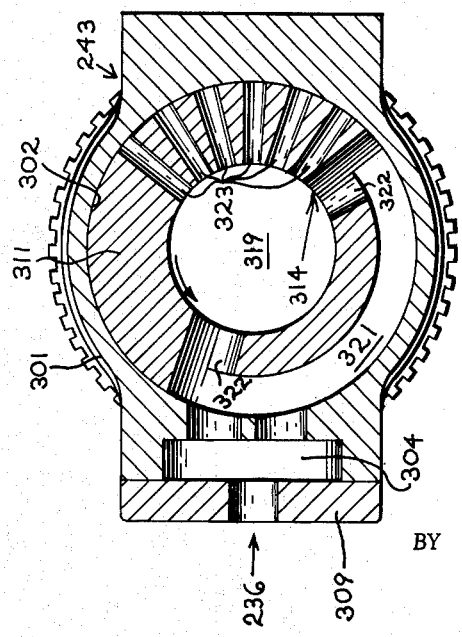
FIG. 14 is a cross-sectional view taken through line 14—14 of FIG. 13.

Before describing the hydraulic system for the uprighter 50 and the clamping mechanism 60, the details of the double port exhaust valve 243 will be described. Referring now to FIGS. 13, 14 and 15, the double port exhaust valve 243 comprises a housing 301 having a cylindrical chamber 302 therein. The housing 301 has a first entrance port 303 on one side thereof and a second entrance port 304 on the other side. The respective entrance ports are positioned so that one lies near one end of the housing 301 and the other lies near the other end of the housing. Each of the ports 303 and 304 is covered by an apertured plate 309 for connecting said ports 303 and 304 with their respective exhaust lines 250 and 236. At one end of the housing 301 is a plate 308 closing the end of the chamber 302. Secured to the plate 308 is a mounting block 306 for securing the exhaust valve to a channel member. The plate 308 is provided with a pair of exhaust ports 305 which communicate with a vertical outlet port 307 in the mounting block 306. Thus, open communication is provided between the chamber 302 and atmosphere.

Rotatably mounted in the chamber 302 is a valve stem 311. The valve stem 311 is secured to the gear 101 by means of a cap screw 310 and key 320. A cover 312 is positioned between the gear 101 and the housing 301. Bushings 321 are positioned between the valve stem 311 and the plate 308 and between the valve stem 311 and the cover 312. The gear 101 is engaged by pinion gear 99 secured to the extension 91b of the forward shaft 91. Inasmuch as the shaft 91 and its extension 91b rotate when the motor 95 is operating, the valve stem 311 is caused to rotate in its housing 301 when the motor is operating.

The valve stem 311 is provided with a first row of apertures generally designated 313 and a second row of apertures generally designated 314. The valve stem 311 has a central passageway 319 which communicates with the rows of apertures 313 and 314 and with exhaust ports 305. The respective rows of apertures 313 and 314 are positioned so that the first row 313 is aligned with the first entrance port 303 and the second row 314 is aligned with the second entrance port 304. A cross-sectional view of the first row of apertures is shown in FIG. 15.

The first row of apertures 313 comprises a slotted portion 315 cut in the outer surface of the valve stem 311 and extending approximately five-twelfths of the way around the periphery thereof. Near each end of the slotted portion 315 is a port 316 communicating with the passageway 319. Starting at one of the ports 316 and extending approximately one-fourth around the periphery of the valve stem 311 are a plurality of radially bored apertures 317. The remaining quarter, more or less, of said first row 313 is solid. Thus, when any substantial part of the slotted portion 315 is aligned with the first entrance port 303, exhaust air received through said port from line 250 is permitted to be freely released to atmosphere. As the valve stem 311 rotates, the end of the slotted portion 315 will rotate past the entrance port so that one by one the apertures 317 become aligned therewith. Obviously, when the apertures 317 are aligned with the entrance port 303, flow of the exhaust air through to the central passageway 319 is restricted from what was permitted when the large slotted portion 315 was aligned with the port 303. Such restriction of exhaust flow reduces the speed of the air motor 95, thus decelerating the pusher plate 89. Continued rotation of the valve stem 311 moves the apertures past the entrance port one by one until all of the apertures have passed such port and the solid portion of said first row 313 becomes aligned with said entrance port 303, thereby closing off the flow of exhaust air from line 250. Such closing off of exhaust air stops the air motor.

For the phase of operation shown in FIGS. 13, 14, and 15, the air motor is rotating the shaft 91 in a clockwise direction to move the pusher plate 89 toward the uprighter. As previously noted, rotation of the motor in this direction causes the exhaust air to flow to the double port exhaust valve 243 through line 250. Such rotation of the shaft 91 and the pinion gear 99 causes the gear 101 and the valve stem 311 to rotate in a counterclockwise direction. In FIGS. 14 and 15, the valve stem 311 is shown as nearing the end of its counterclockwise rotation, thus indicating that the pusher plate is near the end of its stroke toward the uprighter 50. As soon as the last of the apertures 317 passes the port 303, the flow of exhaust air from line 250 is shut off, thereby stopping motor 95.

The second row of apertures 314, shown in detail in FIG. 14, is similar to the first row 313 in that there is provided a slotted portion 321 cut in the outer portion of the valve stem 311 and communicating with the central passageway 319 by means of ports 322. The second row 314 also has a plurality of radially bored apertures 323. However, in contrast with the first row 313 whose apertures 317 are positioned to be trailing the slotted portion 315 when the valve stem 311 is rotating in a counterclockwise direction, the apertures 323 of the second row are positioned to be trailing the slotted portion 321 when the valve stem is rotating in a clockwise direction. Also, the portions of the respective rows 313 and 314 are so positioned around the circumference of the valve stem 311 that as the first row 313 reaches its closed position (i.e., when the last of the apertures 317 passes the port 303 in FIG. 15) the second row 314 reaches its maximum open position (i.e., when slotted portion 321 is aligned with entrance port 304). In that position, the exhaust valve 243 is now ready to receive exhaust air from the reversed air motor 95 through line 236. When the motor is reversed, the valve stem is caused to rotate in a clockwise direction.

By gradually closing off the flow of exhaust air, the double port exhaust valve gradually slows the motor 95 to a stopped position and automatically becomes set to receive exhaust when the motor reverses direction. Thus, there is no sudden stopping of the motor with the resultant wear on the parts.

It should be understood that use of the deceleration valve of the present invention is not limited to a situation where the valve itself completely stops the motor. The primary fuction of the valve is to decelerate the air motor. Accordingly, where it is necessary that the object being moved by the air motor (in this case the pusher plate 89 or the upper portion 35 of the backstop 34) be stopped at the exact same spot on each cycle, such object, and thus the air motor, may be stopped by independent means before the last aperture 317 or 318 passes the port 303 or 304. In such case, such last aperture serves merely as a bleeder.

The single port exhaust valve 227 is identical to the double port exhaust valve 243 except that it has only a single entrance port and a single row of apertures. As previously noted, the single port exhaust valve 227 receives exhaust from the motor 69 only when said motor is rotating in a direction to move the upper portion of the backstop 34 toward the underfeed stacker 30.

The pneumatic system for the uprighter 50 and clamping mechanism 60 will now be described. Initiation of the operation of the uprighter is effected by a counter 350 which is set to count the last three saw cuts from the previous cycle. Movement of each of the last three cuts by the pusher 32 of the aforementioned U.S. Patent 2,855,009 to McCormick actuates an impulse which sets in operation successive phases of the uprighter hydraulic system. Each of the bundles is sawed into a plurality of cuts with the number of cuts depending on the desired length of the partition strips being made, with at least three cuts being sawed from each bundle. Thus, where there are only three cuts from a bundle, each and every cut will actuate an impulse. On the other hand, where, as frequently happens, there are more than three cuts sawed from a bundle, the counter is set to refrain from sending an impulse for all but the last three.

It is assumed in starting the cycle of operations that a single stacked bundle is in the cross-arm portion 135 of the uprighter 50 and that the gates 140 are still in the lowered position which permitted the bundle to enter said cross-arm portion. During this phase when the gates 140 are lowered, the bars 146 operated by the parallel motion arms 147 are raised so that the remaining stacks of bundles are elevated off the surface of the conveyor belts 112 and are prevented from entering the cross-arm portion 135. With the various parts of the uprighter so positioned, the counter 350 is activated by the third to last cut from the preceding bundle to cause the first impulse to be transmitted through wire 269 to limit switch 270. As shown in FIG. 16, the limit switch 270 is closed by the finger 127 of the gate 181 when said gate is closed. Therefore, if such limit switch is closed, the first impulse received through wire 269 is permitted to continue through the limit switch 270 and through wire 271 to a solenoid 272a of valve 272. Actuation of solenoid 272a opens the port of valve 272 leading to line 273 permitting pressured air to flow from a supply source (not shown) to the forward end of the fluid pressure cylinder 169 which carries the lock pin 168 (see FIG. 9). As a result, the cylinder 169 retracts its piston pulling the lock pin 168 out of the hole 163a of the drive plate 162. Inasmuch as the lock pin has been removed and the spring loaded pin 167 of quadrant 161 is engaging hole 163d of the drive plate 162, said drive plate is now ready to be rotated. Retraction of its piston by the cylinder 169 causes an extension 291 to open a valve 292 permitting pressured air to flow through line 253 to the forward end of fluid pressure cylinder 166. The entrance of pressured air to the forward end of the cylinder 166 causes said cylinder to retract its piston rod nad thus move the rack 164 to rotate the drive plate 162 and the cross-arms 135 with the bundle therein. The spring loaded pin 167 of quadrant 161 is thus moved from the position denoted as hole 163d (FIG. 7) to the position denoted as hole 163.

The finger 170 extending from the rack 164 engages limit switch 290 as the rack reaches the end of its travel. Engagement of the limit switch 290 sends an impulse through wire 293 to actuate a solenoid 294a of valve 294. Such actuation opens the port of said valve leading to line 295 which branches to cylinders 144 and 150. Pressured air flowing from the valve supply source through the branch of line 295 leading to the rear end of fluid pressure cylinder 144 causes such cylinder to extend its piston rod and thereby raise the gates 140. Pressured air flowing through the branch line 295 leading to the forward end of fluid presure cylinder 150 causes such cylinder to retract its piston rod, thereby lowering the bars 146 to permit the stacked bundles to move on the continuously moving conveyor belts 112 to the raised gates 140.

The wire 293 which transmitted the impulse from limit switch 290 to solenoid 294a has a branch 293a leading to a second solenoid 272b of valve 272. Actuation of solenoid 272b through wire 293a opens the port of valve 272 leading to line 282, thereby permitting pressured air to flow to the rear end of fluid pressure cylinder 169. This causes the cylinder 169 to extend the lock pin 168 into the lower hole 163a of the drive plate 162, thereby forcing the spring loaded pin 167 out of such hole. The quadrant 161 is now free to be moved back so that the pin 167 can engage hole 163d of the drive plate. Extension of the lock pin 168 releases the extension arm 291 of valve 292, thereby opening the port leading to line 287. This permits pressured air to flow from the supply source through said line 287 to extend the piston rod of cylinder 166, thereby resetting the rack 164 and quadrant 161. When the rack 164 is fully extended so that the spring loaded pin 167 of quadrant 161 is aligned with the hole 163d, the pin will automatically snap into engagement with such hole. Thus, the uprighting mechanism is ready to turn the next bundle.

After the bundle has been turned so that the individual blanks are resting on their longitudinal edges and are being urged by rotation of the rubber coated wheel 174 toward the gate 181, the mechanism is ready to receive the second impulse from the counter 350. The second impulse from the counter 350 is sent through wire 369 to limit switch 264. The limit switch 264 will permit the impulse to continue therethrough only if it is closed by the clamping mechanism being urged against it. Assuming that the clamping mechanism is in position to clamp onto the end of the edge-turned bundle, and is thus holding the limit switch 264 in a closed position, the impulse will be forwarded through wire 371 to a solenoid 372a of valve 372. This actuates the valve 372 to open the port leading to line 373. Line 373 branches so that one branch 373a leads to the rear end of the clamp fluid pressure cylinder 194. The flow of pressured air from the supply source through branch 373a causes cylinder 194 to extend its piston rod and close the clamp arms 187 and 188 around the bundle. The second branch 373b leads through a normally closed bypass valve 374 to the forward end of the gate cylinder 182. The closing of the clamp arms causes the lower portion of arm 187 to strike and thereby open the normally closed bypass valve 374.

This permits the pressured air in line 373b to flow to the forward end of cylinder 182 to thereby cause such cylinder to retract its piston rod and open the gate 181. As previously noted, the cylinder 182 has a finger 127 mounted on a rod 126 which moves with the cylinder piston rod. Retraction of such piston rod causes the finger 127 to engage and close limit switch 275, thereby sending an impulse through wire 376 to a solenoid 265a of valve 265. Such impulse opens the port of said valve leading to line 377 to permit pressured air to flow from a supply source to the rear end of fluid pressure cylinder 202. This causes the cylinder 202 to extend its piston rod to move the dolly 191 and the closed clamp away from the uprighter and toward the saw. However, the fluid pressure cylinder 202 has a limited length of stroke and requires two steps to completely move the bundle off the uprighter.

As the dolly 191 reaches the end of its first stroke, the plate 193 contacts and closes limit switch 278, causing said limit switch to send an impulse through wire 378 and its branches 378a and 378b to solenoid 372b of valve 372 and solenoid 265b of valve 265 respectively.

The actuation of solenoid 372b by the impulse through wire 378a opens the port of valve 372 leading to line 197 thereby permitting pressured air to flow from the supply source to the forward end of cylinder 194 causing such cylinder to retract its piston rod and open the arms of the clamp.

Line 197 has a branch 197a which leads to the rear end of gate cylinder 182. The entrance of pressured air to the rear end of cylinder 182 extends the piston rod of said cylinder and thereby urges the gate 181 toward a closed position. Inasmuch as the trailing portion of the bundle is in the way, the gate 181 is prevented from closing completely. However, it is urged against the bundle, thereby preventing such bundle, being urged by the rubber covered wheel 174, from moving even though the arms of the clamp are open.

The impulse sent through the wire 378b actuates solenoid 265b opening the port of valve 265 leading to line 379, thereby permitting pressured air to flow to the forward end of cylinder 202 causing said cylinder to retract its piston rod and return the dolly 191 and the open clamp to a position for its second bite. As it reaches the end of its stroke adjacent the uprighter, it engages and closes the limit switch 264 sending an impulse through wire 371 to solenoid 372a opening the port of valve 372 leading to line 373. As previously described, pressured air flows through line 373a to close the clamp and through line 373b toward gate cylinder 182. The closing of the clamp causes arm 187 to engage and open the bypass valve 374 permitting the pressured air to continue its flow through line 373b to the forward end of cylinder 182, thereby causing said cylinder to remove the gate 181 from the bundle. Retraction of its piston rod by the cylinder 182 again causes the finger 127 to engage and actuate limit switch 275 sending an impulse through wire 376 to solenoid 265a. This opens the port of valve 265 leading to line 377 permitting pressured air to flow to the rear end of the cylinder 202, thereby moving the carriage toward the saw to complete the second stroke.

Completion of the second stroke causes the plate 193 to again close limit switch 278, thereby opening the clamp and returning the carriage 191 to the uprighter so that it is in position to grasp the next bundle. As previously described, the gate is closed by the cylinder 182 as a result of air flowing through branch line 197a.

The mechanism is now ready to receive a third impulse. The third impulse is transmitted from the counter 350 through wire 380 to a second solenoid 294b to open the port of valve 294 leading to line 381. Line 381 branches so that one branch 381a leads to the read end of cylinder 150 and the other branch 381b leads to the forward end of cylinder 144. The entrance of pressured air to the rear end of cylinder 150 causes the same to extend its piston rod, thereby rotating shaft 148 in a clockwise direction as viewed in FIG. 7 to thereby raise the parallel motion arms 147 and the bars 146. This raising of the bars 146 elevates all but the first of the bundles off the conveyor belts 112. The entrance of pressured air through branch 381b to the forward end of cylinder 144 causes that cylinder to retract its piston rod to thereby lower the gates 140 and permit the first bundle to move on belts 112 into the crossarms 135. The system is now ready to again receive the first impulse.

It may be seen from the foregoing that this invention provides a novel and extremely efficient method and apparatus of handling large panels of sheet material and in sawing them to smaller sizes. It also provides a novel deceleration valve for controlling the movement of an air motor by controlling the flow of its exhaust.

It is readily apparent that numerous changes and modifications will be obvious to those skilled in the art. Accordingly, it is not the intention to limit the scope of the patent granted hereon otherwise than as necessitated by the following claims.

I claim:

1. The method of handling blanks of sheet material between the time that a predetermined number of said blanks are slit from a single panel of sheet material and the time that said blanks are cut transversely of their lengths comprising the steps of underfeed stacking said blanks into bundles by feeding the respective blanks beneath the corresponding blanks of the preceding panel, the number of bundles being the same as said predetermined number, each blank of a single panel forming part of a different bundle; moving said bundles longitudinally with respect to said blanks; engaging said longitudinally moving bundles with a plurality of transversely positioned supporting members; pushing said bundles transversely off said supporting members; rotating each of said bundles about a longitudinal axis so that each of the blanks of said bundle rests on its respective edge; and moving said edge-turned bundles to a saw.

2. The method of cutting panels of sheet material comprising the steps of slitting said panels into a predetermined number of blanks; stacking said blanks into bundles, the number of bundles being the same as said predetermined number, each blank of a single panel forming part of a different bundle; rotating each bundle about a longitudinal axis so that each of the blanks thereof rests upon its respective edge; individually moving said edge-turned bundles longitudinally in front of a saw; and sawing such said bundles transversely to predetermined length.

3. The method of handling blanks of sheet material between the time that a predetermined number of said blanks are slitted from a single panel of sheet material and the time that said blanks are cut transversely of their lengths comprising the steps of forming said blanks into bundles, the number of bundles being the same as said predetermined number, said blank of a single panel forming part of a different bundle; moving said bundles longitudinally with respect to said blanks; engaging said longitudinally moving bundles with a plurality of transversely positioned supporting members; pushing said bundles transversely off said supporting members; rotating each of said bundles about a longitudinal axis so that each of the blanks of said bundles rests on its respective edge; and moving said edge-turned bundles to a saw.

4. The method of processing panels of sheet material during the transverse and longitudinal cutting thereof comprising the steps of slitting said panels into a predetermined number of blanks; stacking said blanks into bundles, the number of bundles being the same as said predetermined number, each blank of a single panel forming part of a different bundle; shifting all of said bundles laterally with respect to said slitting; successively rotating each bundle so that the blanks thereof rest upon their respective longitudinal edges; and moving each of said edge-turned bundles toward a saw.

5. Apparatus for processing panels of sheet material comprising in combination a slitter for cutting said panels longitudinally into a plurality of blanks, stacking means for piling said blanks into bundles while moving said blanks longitudinally, each of the blanks of a panel being stacked into a different bundle, an uprighter for rotating each of said bundles in succession so that the blanks thereof rest on their longitudinal edges, and means for moving each of said edge-turned bundles in succession longitudinally from said uprighter to a work station.

6. Apparatus for processing panels of sheet material comprising in combination a slitter for cutting said panels longitudinally into a plurality of blanks, conveyor means for delivering single panels of said sheet material to said slitter, stacking means for piling said blanks into bundles while moving said blanks longitudinally, each of the blanks of a panel being stacked into a different bundle, said stacking means including a backstop for temporarily halting the flow of blanks and conveyor means for moving said blanks longitudinally from the slitter to said backstop, said conveyor means having a point intermediate its ends elevated above the plane defined by said ends, said point positioned so that the distance from the backstop to said point is less than the length but greater than one-half the length of the panels being stacked, an uprighter for successively rotating said bundles so that the blanks thereof rest on their longitudinal edges, and means for moving said edge-turned bundles to a work station.

7. Apparatus for processing panels of sheet material comprising in combination a slitter for cutting said panels longitudinally into a plurality of blanks, conveyor means for delivering single panels of said sheet material to said slitter, stacking means for piling said blanks into bundles while moving said blanks longitudinally, each of the blanks of a panel being stacked into a different bundle, an uprighter for successively rotating said bundles so that the blanks thereof rest on their longitudinal edges, said uprighter including a plurality of plates mounted on a rotatable shaft, each of said plates having four cross arms at substantially right angles to each other, a conveyor for moving said bundles toward said cross arms, a gate adapted for movement between a raised position for stopping the movement of said bundles prior to their reaching said cross arms and a lowered position, power means for effecting the raising and lowering of said gate, means operable when said gate is lowered for permitting movement of the leading bundles on said conveyor means into said cross arms while preventing movement of the trailing bundles and operable when said gate is raised for permitting movement of the bundles toward the gate, means for rotating said rotatable shaft and said cross arms substantially 90° to thereby rotate the bundle in said cross arms so that the blanks thereof rest on their longitudinal edges, and means for moving said edge-turned bundles to a work station.

8. The apparatus as defined in claim 7, wherein said means operable with said gate comprises a plurality of bars substantially parallel to said uprighter conveyor, said bars adapted for movement between a raised position above said conveyor when said gate is lowered and a lowered position below said conveyor when said gate is raised, the end of said bars being spaced a sufficient distance from said gate to permit a single bundle only to move on the conveyor when the gate is lowered and the bars are raised, and power means for raising and lowering said bars.

9. The apparatus as defined in claim 8, wherein said bars are provided with an extension and means for adjusting the distance between the end of said extension and the gate.

10. The apparatus as defined in claim 7, wherein the means for rotating said rotatable shaft comprises a drive plate rigidly secured to said shaft by means of a hub, said drive plate having four equally spaced apart holes near the periphery thereof, a pie-shaped quadrant rotatably supported on said hub having gear teeth around its arcuate edge, said quadrant carrying a pin adapted to engage the holes of said drive plate, said pin being spring urged toward engagement with said holes, a rack adapted to engage the gear teeth of said quadrant, power means for reciprocally moving said rack, means for disengaging the pin from said hole after each rotation of the drive plate to permit resetting of said rack and quadrant without causing reverse rotation of said drive plate so that said pin becomes aligned for urging into engagement with the next hole.

11. The apparatus as defined in claim 7 further including a continuously rotating wheel positioned to urge the edge-turned blanks off the uprighter.

12. Apparatus for processing panels of sheet material comprising in combination a slitter for cutting said panels longitudinally into a plurality of blanks, conveyor means for delivering single panels of said sheet material to said slitter, stacking means for piling said blanks into bundles while moving said blanks longitudinally, each of the blanks of a panel being stacked into a different bundle, an unloader means receiving the bundles and transferring them laterally in succession, an uprighter receiving the bundles in succession from the unloader and operated to rotate the bundles so that the blanks thereof rest on their longitudinal edges, and means for moving said edge-turned bundles to a work station.

13. The apparatus as defined in claim 12, wherein the unloader means comprises a transversely positioned backstop for temporarily halting the longitudinal movement of stacked bundles, said backstop having an upper portion mounted for horizontal movement in a longitudinal direction away from said stacking means and a lower portion mounted for vertical movement, said upper portion including a plurality of downwardly extending fingers, said lower portion including a plurality of upwardly extending fingers, conveyor means for reciprocally moving said upper portion toward and away from said stacking means, said conveyor means having a plurality of transverse supporting members which engage and thereby support said bundles, means for reciprocally moving said lower portion between a raised position wherein the upwardly extending fingers prevent the movement of bundles and a lowered position wherein the upwardly extending fingers lie below said bundles and permit said bundles to move thereover, and pusher means for moving the bundles transversely off the transverse supporting members and on to the uprighter.

14. The apparatus as defined in claim 13 wherein the pusher means includes a dolly adapted to be moved across said unloader transversely of said bundles, a pusher plate mounted on said dolly for engagement with the longitudinal edge of the bundle furthest from the uprighter, and motor means for powering the movement of said dolly.

15. The apparatus as defined in claim 13 wherein the pusher means includes a dolly adapted to be moved across said unloader transversely of said bundles, a pusher plate mounted on said dolly for engagement with the longitudinal edge of the bundle furthest from the uprighter, an air motor for powering the movement of said dolly, and an exhaust valve for decelerating said motor.

References Cited by the Examiner
UNITED STATES PATENTS

| | | | |
|---|---|---|---|
| 349,027 | 9/1886 | Baur et al. | 83—155 |
| 1,088,573 | 2/1914 | Heldmann | 83—418 |
| 1,471,372 | 10/1923 | Winkley | 83—94 |
| 1,635,165 | 7/1927 | Adamsky | 83—418 |
| 1,807,085 | 5/1931 | Crickmer | 137—625.47 |
| 1,976,171 | 10/1934 | Hutchings | 83—35 |
| 2,156,419 | 5/1939 | Zomnir | 83—89 |
| 2,315,256 | 3/1943 | Haegele et al. | 83—89 |

(Other references on following page)

UNITED STATES PATENTS

| | | | |
|---|---|---|---|
| 2,327,103 | 8/1943 | Gude | 83—102 |
| 2,696,255 | 12/1954 | Heywood | 83—35 |
| 2,706,053 | 4/1955 | Doller | 214—7 |
| 2,779,368 | 1/1957 | Lorimer et al. | |
| 2,850,090 | 9/1958 | Biel et al. | 83—35 |
| 2,851,172 | 9/1958 | Seragnoli | 214—7 |
| 2,905,197 | 9/1959 | Janes | 137—625.47 |
| 2,936,557 | 5/1960 | Fay | 214—7 |
| 2,953,233 | 9/1960 | Zurheide. | |
| 2,954,881 | 10/1960 | Hopton et al. | 214—7 |

FOREIGN PATENTS

| | | |
|---|---|---|
| 951,996 | 4/1949 | France. |

WILLIAM W. DYER, Jr., *Primary Examiner.*

HUNTER C. BOURNE, Jr., ANDREW R. JUHASZ,
*Examiners.*